United States Patent [19]

Sakamoto

[11] Patent Number: 5,481,366

[45] Date of Patent: Jan. 2, 1996

[54] METHOD OF AND APPARATUS FOR PRODUCING A UNIT PATTERN ON A PRINTING CYLINDER FOR PRINTING AN ENDLESS PATTERN

[75] Inventor: Takashi Sakamoto, Kyoto, Japan

[73] Assignee: Dainippon Screen Mfg. Co., Ltd., Japan

[21] Appl. No.: 122,050

[22] Filed: Sep. 14, 1993

[30] Foreign Application Priority Data

Sep. 14, 1992 [JP] Japan ................................. 4-271013
Jul. 19, 1993 [JP] Japan ................................. 5-200421

[51] Int. Cl.$^6$ ................................................. H04N 1/21
[52] U.S. Cl. ............................................ 358/296; 358/447
[58] Field of Search .................................. 358/296, 298, 358/401, 450, 460, 462, 447, 448, 455, 456

[56] References Cited

U.S. PATENT DOCUMENTS 4,013,829  3/1977  Baar et al. .
5,177,795  5/1995  Tahioko et al. ........................ 358/450
5,404,233  4/1995  Nagata et al. ........................ 358/456

FOREIGN PATENT DOCUMENTS 3230719   3/1983  Germany .
56-16074  4/1981  Japan .
57-29457  2/1982  Japan .
57-11781  3/1986  Japan .
2-63741   3/1990  Japan .
86/00770  1/1986  WIPO .
WO92/10904 6/1992 WIPO .

OTHER PUBLICATIONS

Patent Abstracts of Japan, vol. 12, No. 343 (M–741) 14 Sep. 1988 & JP-A-63104839 (Dainippon Printing) 10 May 1988, *Abstract*.
European Search Report for European Patent Appln. No. 93114684.9 dated Dec. 21, 1993.

Primary Examiner—Mark J. Reinhart
Attorney, Agent, or Firm—Ostrolenk, Faber, Gerb & Soffen

[57] ABSTRACT

A method of producing a unit pattern on a printing cylinder for printing an endless pattern including the steps of: storing pixel signals expressing pixels of an original picture in memory means; distinguishing the pixel signals into first pixel signals which approximate to respective their corresponding pixel signals distant therefrom by a repetition length in a primary scanning direction and second pixel signals which are much different from the same; producing a cutting line extending across the original picture in a secondary scanning direction, said cutting line passing through the pixels of the original picture expressed by the first pixel signals as much as possible; extracting pattern pixel signals which exist between the cutting line and an imaginary line distant therefrom by the repetition length from the pixel signals; smoothing the pattern pixel signals close to the cutting line and the imaginary line; and recording the unit pattern on the printing cylinder on the basis of the smoothed pattern pixel signals.

17 Claims, 20 Drawing Sheets

METHOD OF AND APPARATUS FOR PRODUCING A UNIT PATTERN ON A PRINTING CYLINDER FOR PRINTING AN ENDLESS PATTERN

The present invention relates to a method of and an apparatus for producing a unit pattern on a cylindrical printing plate (or a printing cylinder) used in gravure printing or in rotary screen printing for printing an endless pattern.

BACKGROUND OF THE INVENTION

In gravure printing or rotary screen printing that use a cylindrical printing plate (printing cylinder), it is possible to print an endless pattern on a printing medium by repeatedly printing a unit pattern that covers the entire periphery of the cylindrical surface.

An example of recording a unit pattern on a gravure printing cylinder is illustrated in FIG. 2, which is prepared to explain the preferred embodiments of the present invention later but has the same structure in an input section 11 and in an output section 12 as the conventional apparatus.

An original picture is fixed on an input cylinder 111 in the input section 11, and the input cylinder 111 and a printing cylinder 121 in the output section 12 are rotated synchronously. The input cylinder 111 is driven by a motor 112, and the printing cylinder 121 is driven by another motor 122. The rotative positions of the input cylinder 111 and the printing cylinder 121 are respectively detected by rotary encoders 113 and 123. With the signals from the rotary encoders 113 and 123, a controller 15 controls the motors 112 and 122 to synchronize the rotations of the input cylinder 111 and the printing cylinder 121. A pickup head 114 is provided to move along the axis of the input cylinder 111 on a ball-screw 115 which is driven by a motor 116. A recording head 124 is similarly provided to move along the axis of the printing cylinder 121 on another ball-screw 125 which is driven by another motor 126. Another set of rotary encoders 117 and 127 are provided for respectively detecting the positions of the pickup head 114 and the recording head 124. The controller 15 synchronizes the movement of the two heads 114 and 124 with the rotations of the cylinders 111 and 121. While two-dimensional scanning is effected using such mechanism in the input section 11 and in the output section 12 respectively, the image of the original picture is read with the pickup head 114 in the input section 11 and the image is recorded on the printing cylinder 121 with the recording head 124 in the output section 12.

The input cylinder 111 and the printing cylinder 121 are rotated synchronously in the above explanation. It is not necessary, however, to rotate them simultaneously: the image data thus input can be stored in a memory (RAM in the controller 15, for example) once, and then the image data is restored from the memory at another time, where the rotation of the printing cylinder 121 is synchronized with the rotation of the input cylinder 111 when the image was read.

The recording head 124 normally moves intermittently along the axis of the printing cylinder 121. That is, for a rotation of the printing cylinder 121, the recording head stays stationary and records a line of the image (i.e., engraves a linear array of cells) as shown in FIG. 4A. The direction of the rotation of the printing cylinder 121 is hereinafter referred to as the primary scanning direction and the line is referred to as a primary scanning line. Then the recording head 124 moves by a unit length to the next position along the axis of the printing cylinder 121, and stays there for another rotation of the printing cylinder 121 to record the next line of the image. The direction of the movement of the recording head 124 is referred to as the secondary scanning direction.

If a unit pattern is to be recorded, record-starting points of adjacent primary scanning lines should be at the same rotative position. The intermittent movement of the recording head 124 described above requires the time for the recording head 124 to move by the unit length from one primary scanning line to the next primary scanning line, and causes an idle rotation of the printing cylinder 121 between the adjacent recording lines. When, therefore, the ring recording method as shown in FIG. 4A is adopted to record a unit pattern constituted of M primary scanning lines, the printing cylinder 121 must rotate 2×M times.

An improved method is proposed in the U.S. Pat. No. 4,013,829 in which the record-starting points of adjacent primary scanning lines are displaced in the primary scanning direction (or in the rotative direction) regarding the time necessary to move the recording head, whereby the idle rotation between lines is eliminated.

Because, for speedier recording (engraving), the engraving stylus of a gravure recording head is always vibrated by resonance, the depth of the cells is shallower than normal at first when the engraving stylus is once lifted and then dropped to record a new line. The Japanese Examined Patent Application No. 56-16074 shows a double engraving method in which a primary scanning line is recorded 1+α rotations to engrave the first cells twice to obtain the normal depth.

In the two methods, the printing cylinder 121 idles while the engraving stylus is lifted, moved to the next recording line and dropped to record the next line (in the latter double engraving method, the double engraving time is added).

A more efficient method is the helical recording method. In the helical recording method, the recording head is moved continuously in the secondary scanning direction while the printing cylinder 121 is rotated, whereby the cells are engraved helically on the printing cylinder 121 as shown in FIG. 4B. In this case, the idle rotation of the printing cylinder 121 is eliminated.

There is still a problem in recording a unit pattern on the printing cylinder 121, whether by the ring recording method (FIG. 4A) or by the helical recording method (FIG. 4B). There are two kinds of endless patterns: a) an endless pattern of a narrower sense in which an independent and separate element or elements lie on a uniform background forming a unit pattern, and the unit pattern is repeated endlessly; and b) a seamless pattern in which no independent element exists or no uniform background exists between elements of the pattern. In case of the endless pattern of the narrower sense a), a natural endless pattern (which means that the joining line between adjacent unit patterns is invisible) can be formed by cutting out the unit pattern with such two parallel (but not necessarily straight) lines that pass through the uniform background and by joining the unit pattern repeatedly. In case of the seamless pattern b), a discrepancy is inevitable at the joining line of the unit patterns and the joining lines look apparent because no such lines exists that passes exclusively through the uniform background. Thus producing a natural seamless pattern is difficult.

Japanese Unexamined Patent Application No. 57-29457 (Examined No. 4-24225) discloses a method in which a unit pattern a little longer than the periphery of the printing cylinder is prepared, and the image data in the excessive length (the overlapping portion) of the unit pattern is gradually changed to smoothly join the adjacent unit patterns.

Further, the International Publication WO 86/00770 discloses a method using an indented mask corresponding to the pattern in order to camouflage the joint. Though, in these methods, steep change at the joint can be avoided, the image at the joint looks unnatural because the image at the joint is constituted of an overlapped double image of the adjacent unit patterns and the image is blurred. Further, in the method of WO 86/00770, the shape of the mask must correspond to every specific pattern so that preparation of the mask is troublesome.

The above problem is not limited to recording a unit pattern on the gravure printing cylinder, but a similar problem occurs in recording a unit pattern on the printing cylinder of a rotary screen printing. Japanese Published Examined Patent Application No. 57-11781, Unexamined Patent Application No. 2-63741 etc. describe about producing a rotary screen printing.

SUMMARY OF THE INVENTION

An object of the present invention is, therefor, to provide a rather simple method of and apparatus for producing a unit pattern on a printing cylinder for printing natural-looking endless and seamless patterns in gravure printing or in rotary screen printing.

According to the present invention, a method of producing a unit pattern (where the unit pattern has a repetition length in a primary scanning direction) on a printing cylinder for printing an endless pattern on a printing medium by repeatedly printing the unit pattern includes the following steps:

storing pixel signals expressing pixels of an original picture in memory means, where the pixels of the original picture are arranged in the primary scanning direction and a secondary scanning direction orthogonal to the primary scanning direction;

distinguishing the pixel signals stored in the memory means into first pixel signals and second pixel signals by comparing the pixel signals with respective their corresponding pixel signals distant therefrom by the repetition length in the primary scanning direction, where the first pixel signals are approximate to the corresponding pixel signals, and the second pixel signals are much different from the same;

producing a cutting line extending across the original picture in the secondary scanning direction, where the cutting line passes through the pixels of the original picture expressed by the first pixel signals as much as possible;

extracting pattern pixel signals from the pixel signals stored in the memory means, where the pattern pixel signals exist between the cutting line and an imaginary line distant therefrom by the repetition length in the primary scanning direction;

smoothing the pattern pixel signals close to the cutting line and the imaginary line in the primary scanning direction, thereby producing unit pattern signals expressing the unit pattern; and recording the unit pattern on the printing cylinder on the basis of the unit pattern signals.

When, in the above method of the present invention, a unit pattern is cut out from an original picture with the cutting line and the imaginary cutting line, the two parallel (but not necessarily straight) cutting lines are selected to pass proximate (or similar) pixels as much as possible. Owing to the proper selection of such cutting lines and the smoothing process at about the cutting lines, the seamless pattern looks natural at the joining line of the unit pattern.

According to the present invention, an apparatus for recording a unit pattern (where the unit pattern has a repetition length in a primary scanning direction) on a printing cylinder for printing an endless pattern on a printing medium by repeatedly printing said unit pattern includes:

first memory means for storing pixel signals expressing pixels of an original picture, where the pixels of the original picture are arranged in the primary scanning direction and a secondary scanning direction orthogonal to the primary scanning direction;

judging means for generating first judgment signals and second judgment signals by comparing the pixel signals with respective their corresponding pixel signals distant therefrom by the repetition length in the primary scanning direction, where the first judgment signals express that the pixel signals approximate to the corresponding pixel signals, and the second judgment signals express that the pixel signals are much different from the same;

second memory means for storing the first judgment signals and the second judges signals;

cutting line producing means for producing a cutting line extending across the original picture in the secondary scanning direction, where the cutting line passes through the pixels of the original picture associated with the first judgment signals as much as possible;

unit pattern extracting means for extracting pattern pixel signals from the pixel signals stored in the first memory means, the pattern pixel signals exist between the cutting line and an imaginary line distant therefrom by the repetition length in the primary scanning direction;

third memory means for storing the pattern pixel signals extracted by the unit pattern extracting means;

smoothing means for smoothing the pattern pixel signals close to the cutting line and the imaginary line in the primary scanning direction, thereby producing unit pattern signals expressing the unit pattern; and recording means for recording the unit pattern on the printing cylinder on the basis of the unit pattern signals.

Other features and details of the present invention are given with the description of preferred embodiments that follow.

DETAILED DESCRIPTION OF PREFERRED EMBODIMENTS

Figure 2:
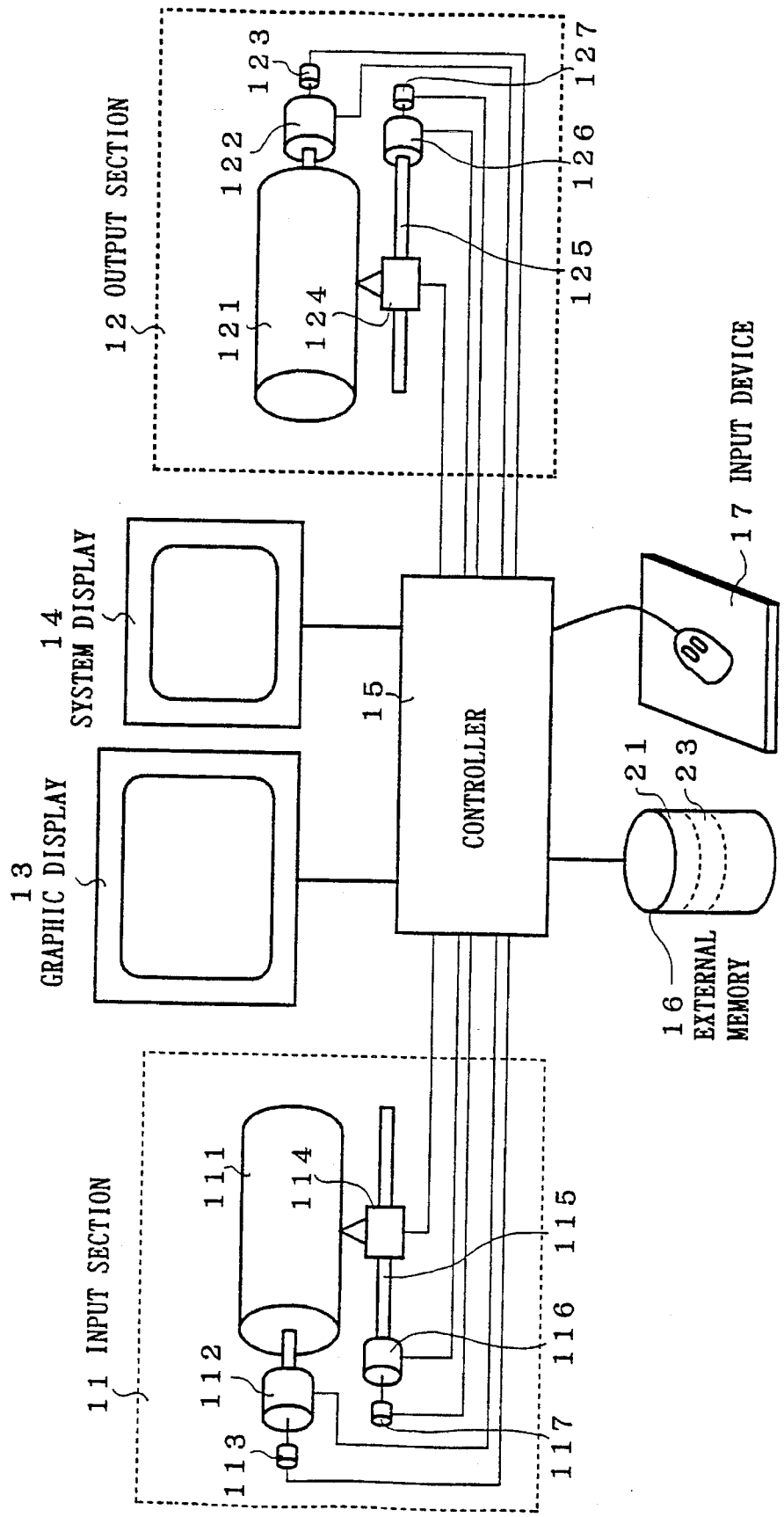
FIG. 2 is a block diagram of a gravure engraving machine of the embodiment.

A gravure engraving machine is now described as an embodiment of the present invention. The engraving machine is constructed as shown in FIG. 2 and the basic movement of the input section 11 and the output section 12 is already explained in the above description. The engraving machine is an embodiment of the present invention since the controller 15 of the machine works according to predetermined programs which employ the method of the present invention.

Figure 3:
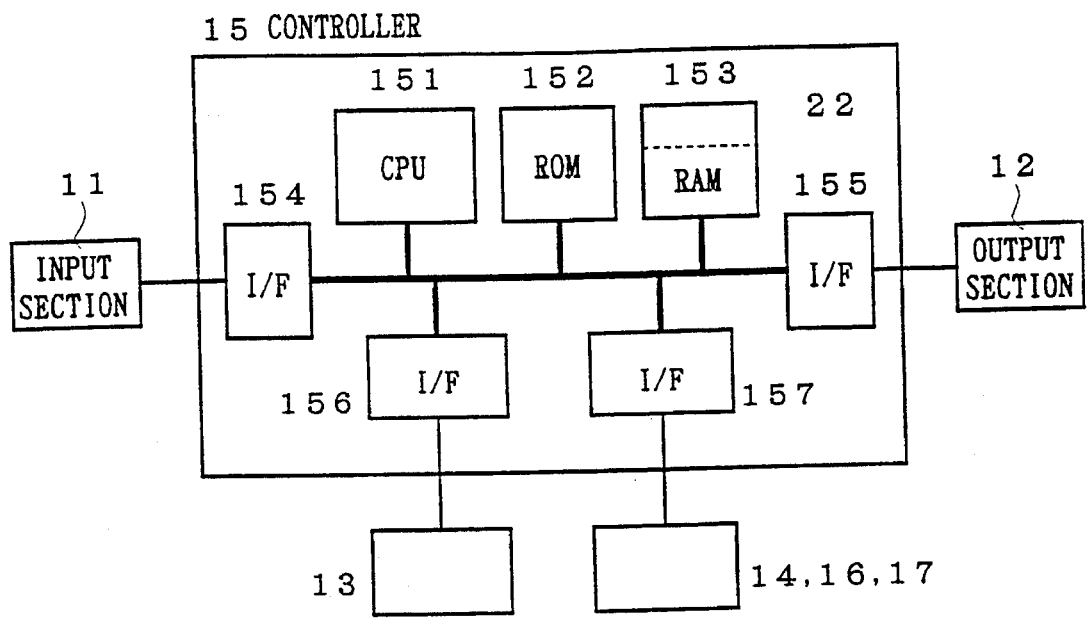
FIG. 3 is a block diagram of a controller of the gravure engraving machine of the embodiment.

The controller 15 includes a microcomputer constructed of a CPU 151, a ROM 152, and a RAM 153, as shown in FIG. 3. The controller 15 is further equipped with interfaces (I/F) 154, 155, 156 and 157 for the input section 11, the output section 12, a graphic display 13 and other peripheral devices (including a system display 14, an external memory 16, an input device 17). The RAM 153 includes, besides the main memory area used by the CPU 151, a graphic memory area for storing the image data sent from the input section 11.

The CPU 151 controls the overall movement of the engraving machine according to the programs stored in the ROM 152 or loaded from the external memory 16 to the main memory, where the program for producing an endless pattern printing cylinder is included.

Figure 1:
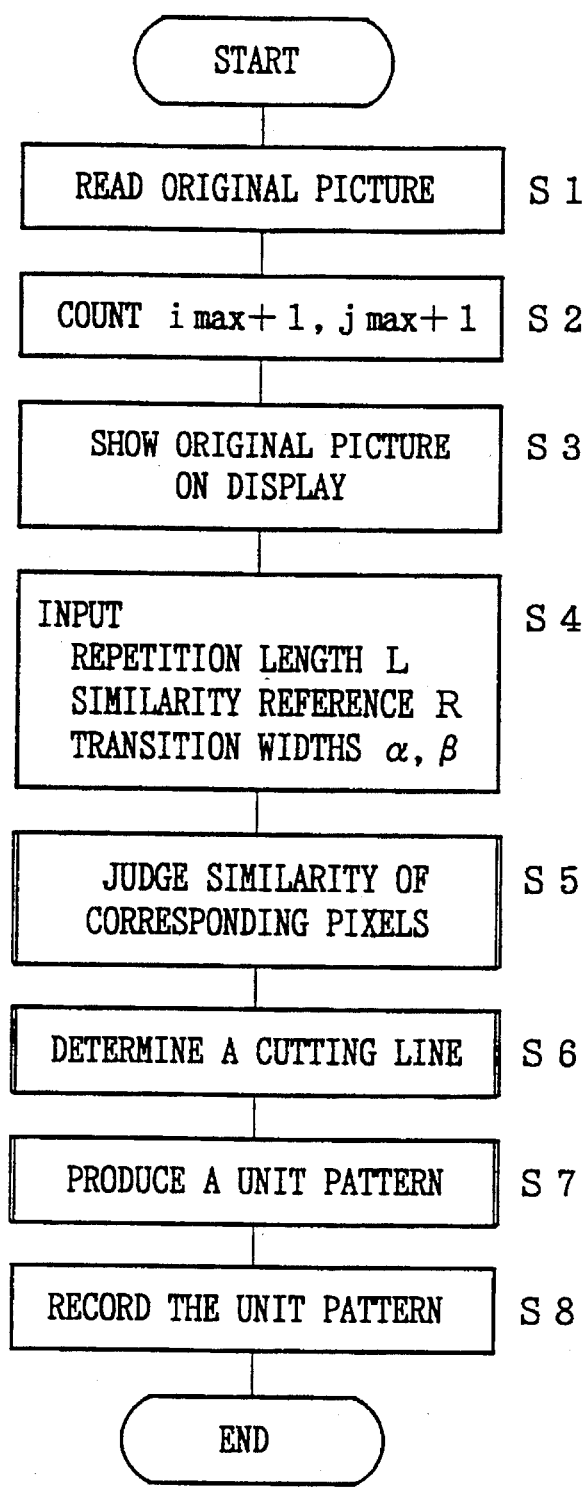
FIG. 1 is a general flowchart of recording a unit pattern on a gravure printing cylinder for a seamless pattern as an embodiment of the present invention.
Figure 5:
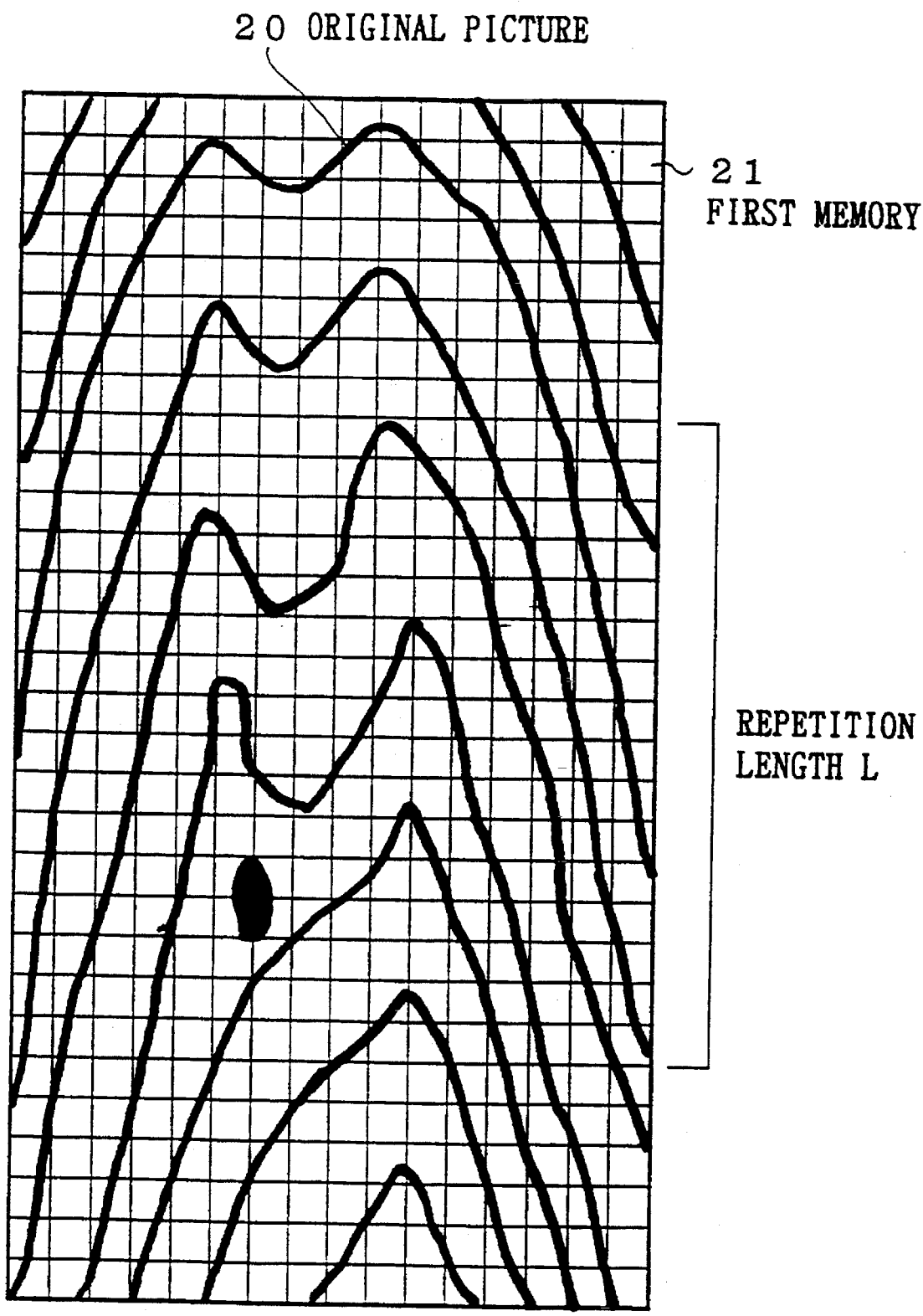
FIG. 5 is a schematic illustration showing an original picture overlapped with the pixel structure of a first memory of the embodiment.

The movement of the engraving machine of the present embodiment is now described for producing a seamless pattern based on an original picture 20, as shown in FIG. 5, of wood grain. The general flowchart of the process is shown in FIG. 1. First, the original picture 20, which will be repeatedly joined to form a seamless pattern, is read in the input section 11 by the primary scanning line. Every primary scanning line is constituted of a plurality of pixels, and image data is produced for every pixel and stored in a first memory area (first memory) 21 prepared in the RAM 153 or in the external memory 16 (step S1). In reading the original picture, the number of primary scanning lines and the number of secondary scanning lines (which is the number of pixels in a primary scanning line) are counted and stored in the memory (step S2). Here the number of the primary scanning lines is supposed to be $i_{max}+1$, and the number of the secondary scanning lines is supposed to be $j_{max}+1$ (cf. FIG.. 16). It is possible at step S2 to get the image data from an optical disk or such in which image data is already stored, instead of reading an original picture 20 in the input section 11. In this case, the data of the number of scanning lines is normally stored in the header portion of the image data file.

The image data of the original picture 20 stored in the first memory 21 is sent to the graphic display 13 (step S3), and, looking at the display of the original picture 20, the operator gives data of a repetition length L, a similarity reference value R, and two transition widths α and β using the input device 17 (a digitizer, keyboard, etc. can be used instead of the mouse shown in FIG. 2). The repetition length L is set equal to the circumference of the printing cylinder 121.

Similarity Judgement

After setting those parameters at step S4, the value of a pixel and the value of another pixel which is the repetition length L distant in the primary scanning direction (these two pixels are referred to as corresponding pixels) are compared for every pixel of the original picture 20 stored in the first memory 21. The absolute difference of the two values are compared with the similarity reference value R and the result is stored in a second memory area (second memory) 22 prepared in the RAM 153 (step S5). The second memory 22 can be prepared in the external memory 16.

Figure 16:
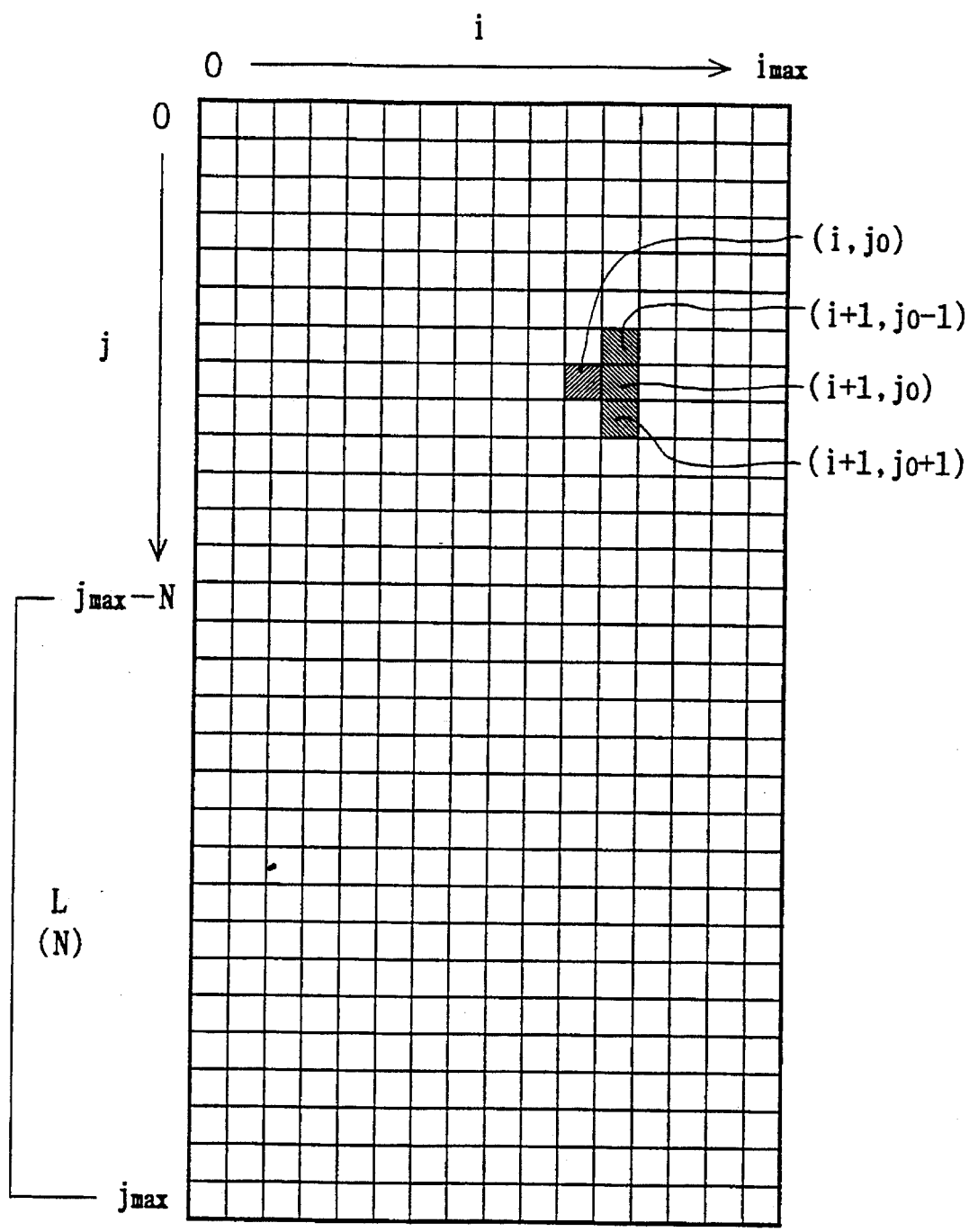
FIG. 16 is an explanatory diagram of the arrangement of the pixels.
Figure 17:
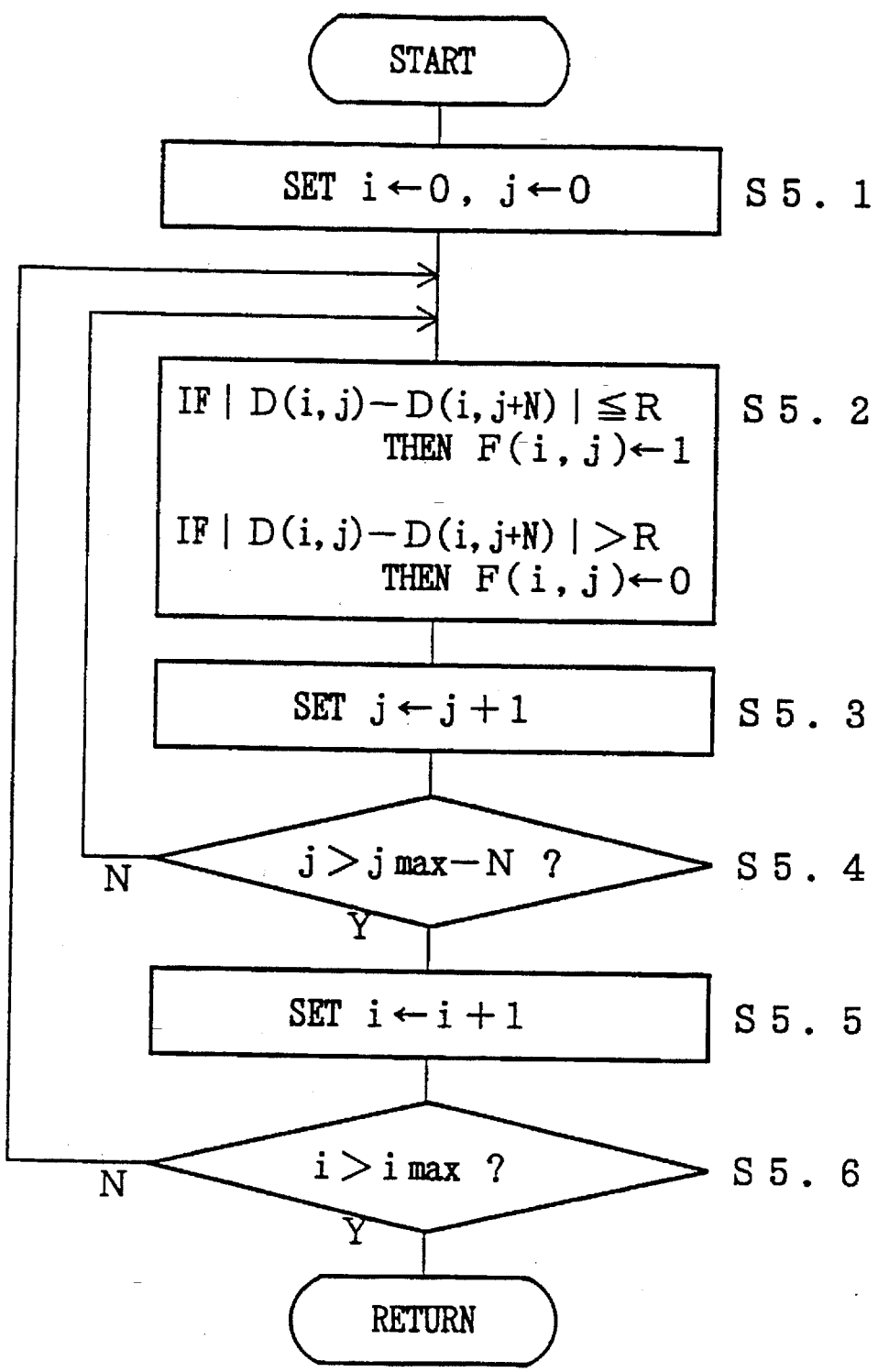
FIG. 17 is a flowchart of a subroutine of FIG. 1 for judging similarity between corresponding pixels.

The process is detailed referring to the flowchart of FIG. 17. The abstract flow of the present routine is as follows. After initializing the variables i and j to zero at step S5.1 for counting the primary and secondary scanning lines (cf. FIG. 16), the variable j for the primary scanning lines is incremented by 1 at step S5.3 and the variable i for the secondary scanning lines is incremented by 1 at step S5.5, while the process at step S5.2 is executed for each object pixel until $j=j_{max}-N$ and $i=i_{max}$ (steps S5.4 and S5.6).

At step S5.2, the absolute difference $|D(i,j)-D(i,j+N)|$ is calculated between the image data $D(i,j)$ of an object pixel and the image data $D(i,j+N)$ of the corresponding pixel which is distant from the object pixel $D(i,j)$ by the repetition length L in the primary scanning direction, where N is the number of pixels corresponding to the repetition length L. Then the absolute difference $|D(i,j)-D(i,j+N)|$ is compared with the similarity reference value R. if $|D(i,j)-D(i,j+N)| \leq R$, the similarity flag $F(i,j)$ which is prepared for each pixel is set to 1, and if $|D(i,j)-D(i,j+N)|>R$, the similarity flag $F(i,j)$ is set to 0. The pixel area of $F(i,j)=1$ is hereinafter referred to as the "similar area" and the pixel area of $F(i,j)=0$ is referred to as the "dissimilar area". When the similarity judgement for all pixels in the first memory 21 is finished, the similarity flag $F(i,j)$ of all the pixels are determined. The similarity flag $F(i,j)$ is stored in the second memory 22. The judgement at step S5.4 is done for $j>j_{max}-N$, instead of $j>j_{max}$, because no pixel exists corresponding to the pixels of $j_{max}-N<j<j_{max}$ (cf. FIG. 16).

Figure 6:
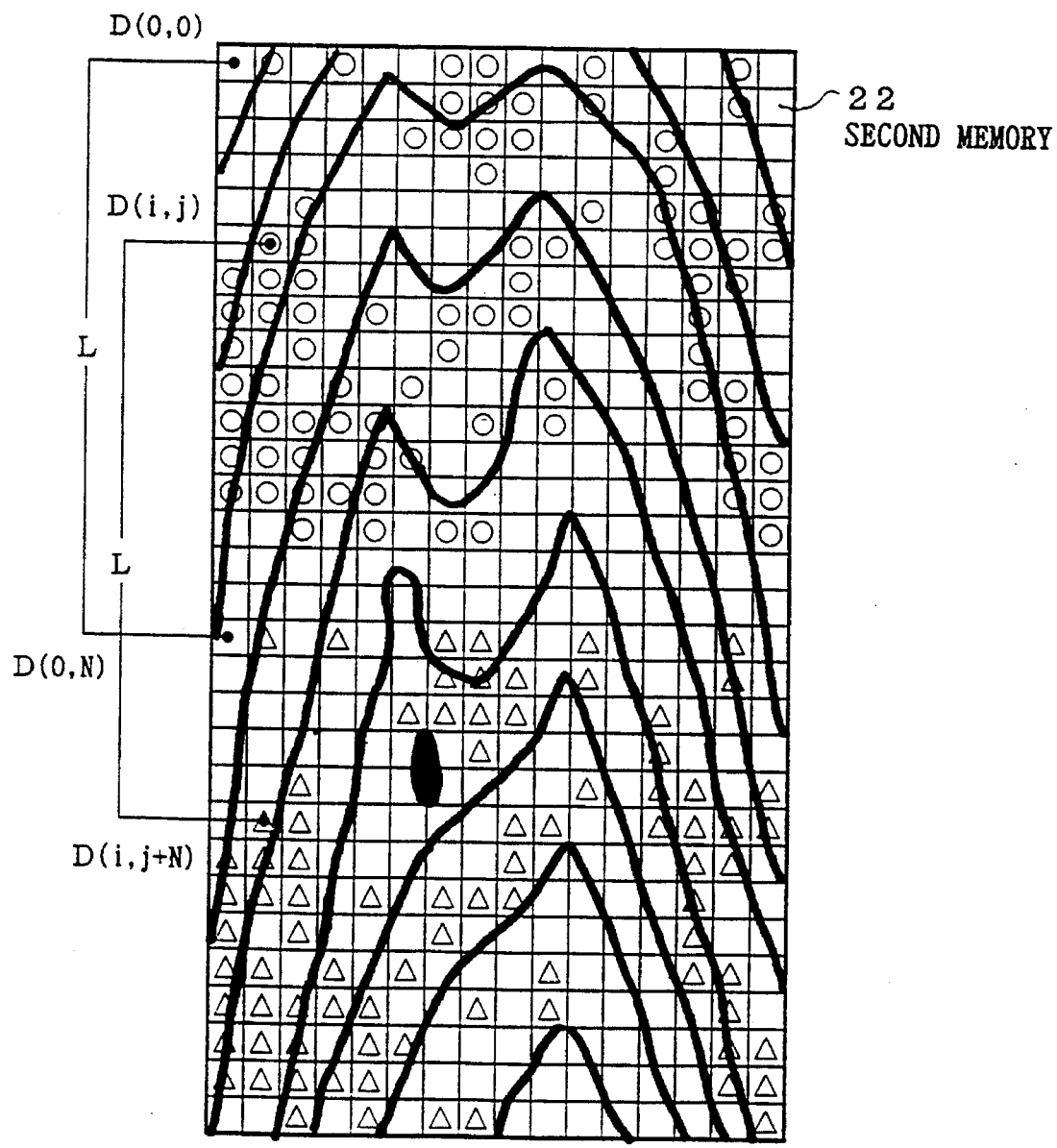
FIG. 6 is a schematic illustration showing the original picture overlapped with the pixel structure and similarity data in a second memory of the embodiment.

The similarity judgement is illustrated in concrete using FIG. 6. First, the absolute difference $|D(0,0)-D(0,N)|$ is calculated between the image data $D(0,0)$ of the first pixel of the first primary scanning line $G(0,0)$ and the image data $D(0,N)$ of the corresponding pixel $G(0,N)$ which is distant from the pixel $G(0,0)$ by the repetition length L (i.e., N pixels). Then the absolute difference is compared to the reference value R. Since, in the example of FIG. 6, the pixel G(0,0) is not on a grain line while the corresponding pixel G(0,N) is on a grain line, the absolute difference |D(0,0)–D(0,N)| of the two pixels is greater than the similarity reference value R, and the similarity flag F(0,0) (which is stored in the second memory 22) for the pixel G(0,0) is set to 0. Such pixels of F(i,j)=0 are unmarked in FIG. 6.

Since, on the other hand, the pixel G(i,j) and the corresponding pixel G(i,j+N) are both on grain lines, the absolute difference |D(i,j)–D(i,j+N)| is smaller than the similarity reference value R, and the similarity flag F(i,j) for the pixel G(i,j) is set to 1. Such pixels of F(i,j)=1 are marked with open circles, and the corresponding pixels are marked with open triangles in FIG. 6. The pixels in the similar area (i.e., F(i,j)=1) is important in constructing a cutting line. Though the original picture 20 is shown in FIG. 6 besides the pixel structure of the second memory 22, it should be noted that the second memory 22 stores only the values 0 and 1 of the similarity flags F(i,j).

Determining a Cutting Line

Reference comes back to the flowchart of FIG. 1. Based on the results (i.e., the similarity flags F(i,j) in the second memory 22) of the similarity judgement at step S5, a cutting line for cutting out a unit pattern of the seamless pattern from the original picture 20 is determined at step S6 so that the cutting line passes through the similar areas as much as possible (or averts the dissimilar area as much as possible).

Figure 18:
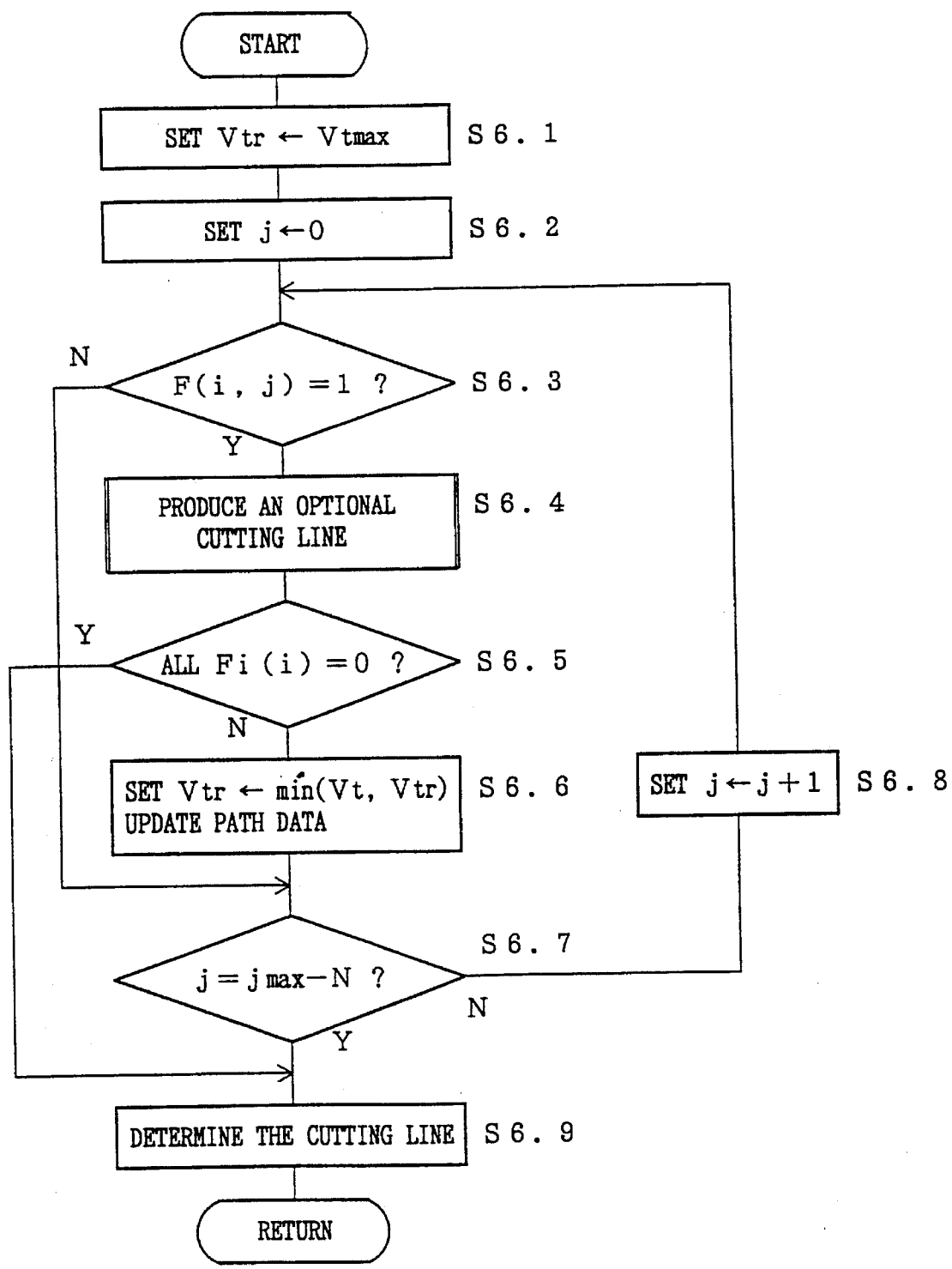
FIG. 18 is a flowchart of a subroutine for determining a cutting line.
Figure 19:
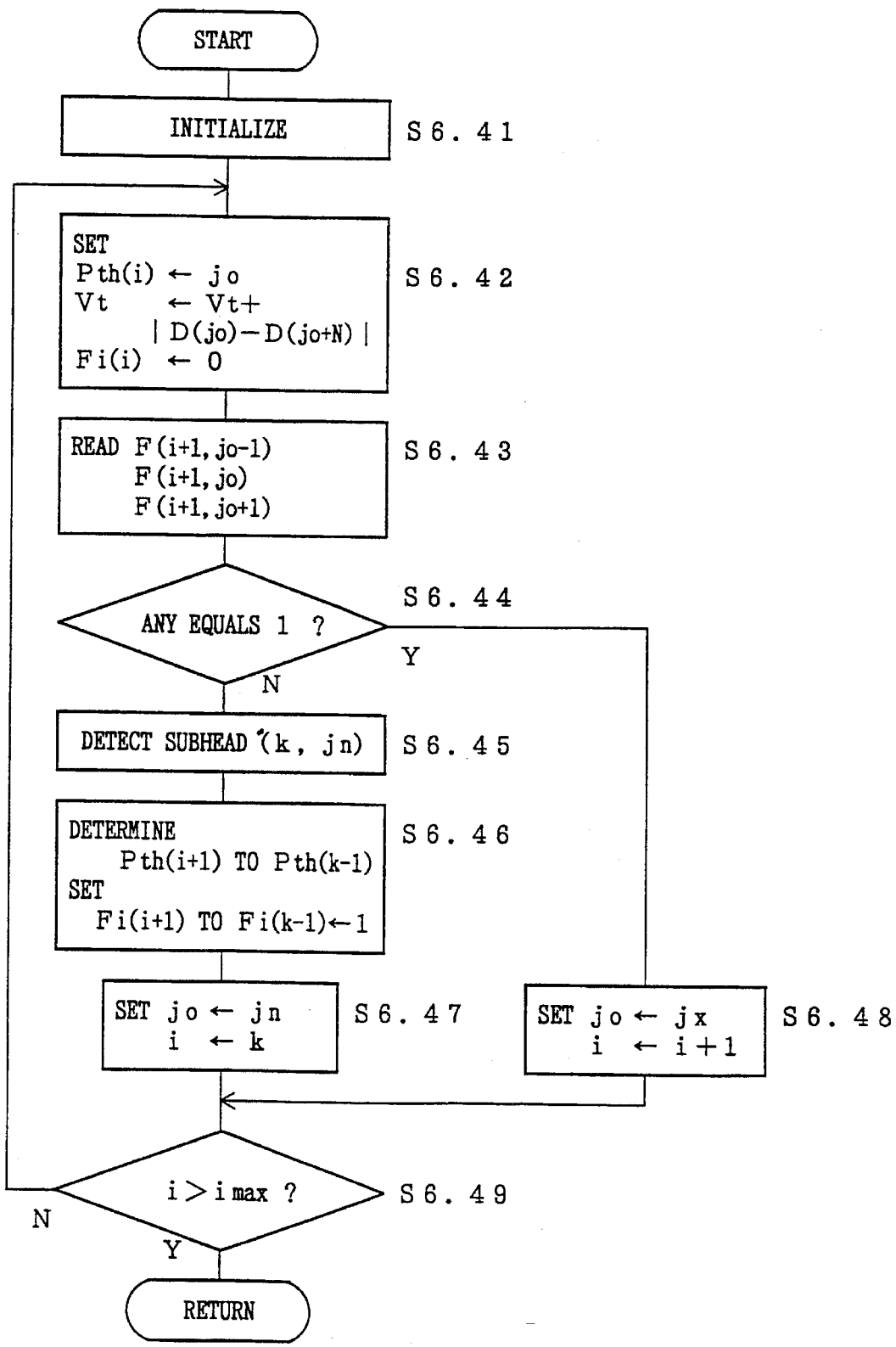
FIG. 19 is a flowchart of a subroutine for producing an option of the cutting line.

The cutting line determining process is explained referring to the flowcharts of FIGS. 18 and 19. The abstract of the present routine is as follows. For every pixel (j=0 to $j_{max}$–N) on the first primary scanning line (i=0), an option of the cutting line starting from the pixel is produced, and a selection criterion $V_t$ is attached to the optional cutting line. In the present embodiment, the sum of the absolute differences |D(i,j)–D(i,j+N)| of the pixels constituting the optional cutting line is adopted as the selection criterion $V_t$. The actual cutting line is decided of the option that has the smallest selection criterion $V_t$.

The optional cutting line producing process is detailed referring to FIG. 18. First, the reference variable $V_{tr}$ for the selection criterion $V_t$ is initialized to the maximum value possible of the selection criterion $V_t$. Then the variable j is initialized to 0 at step S6.2 and incremented by 1 at step S6.9, while the following steps S6.3 to S6.7 are executed until j=$j_{max}$–N ( step S6.8 ).

The process executed for every pixel (object pixel ) of j=0 to $j_{max}$–N is as follows. First, the similarity flag F(i,j) of the object pixel is determined if it is 1 or 0 (step S6.3). If the object pixel is in a dissimilar area (i.e., F(i,j)=0), the following steps are skipped until step S6.8 and the next pixel is processed. If the object pixel is in a similar area (i.e., F(i,j)=1), an option of the cutting line is produced at step S6.4.

The process of producing an option of the cutting line is detailed referring to the flowchart of FIG. 19. First, path memory $P_{th}$(i), selection criterion $V_t$ and virtual line flag $F_t$(i) are initialized (step S6.41). The path memory $P_{th}$(i) stores the position in the primary scanning line (primary position; i.e., the value of j) for every position (secondary position) i=0 to $i_{max}$ of the optional cutting line to be produced. Since $V_t$ (selection criterion) is a variable for storing the cumulative value of the absolute difference |D(j_0)–D(j_0+N)|, it is initialized to 0. The virtual line flag $F_t$(i) is attached to every pixel on the optional cutting line and shows whether the pixel is in the similar area (F_t(i)=0) or in the dissimilar area (F_t(i)=1).

After the initialization, the primary position $j_0$ of the present object pixel (the object pixel is always in the similar area due to the judgement of step S6.3 and later-described steps S6.46 and S6.47) is stored in the path memory $P_{th}$(i) at step S6.42. Then the absolute difference |D(j_0)–D(j_0+N)| of the data between the object pixel and the corresponding pixel is accumulated on the selection criterion $V_t$, and the virtual line flag $F_t$(i) for the object pixel is set to 0 at step S6.42.

By storing the values of |D(i,j)–D(i,j+N)| calculated for all the pixels at step S5.2 and retrieving the value of the object pixel from the storage at step S6.42, the processing time is decreased.

Then the values of the similarity flags F(i+1,$j_0$–1), F(j+1,$j_0$) and F(i+1,$j_0$31 1) are read out at step S6.43 and determined whether any of them is 1 at step S6.44. The three similarity flags are of the three pixels, as shown in FIG. 16, lying ahead of the present object pixel at the next secondary position i+1 and at the primary positions of –1, 0 and +1 with respect to the present primary position $j_0$ (the three pixels are hereinafter referred to as the neighboring pixels). When any one of the similarity flags is found to be 1 after examining them in a predetermined order (e.g., in the order of –1, 0, +1), the process proceeds to step S6.48, where the primary position $j_x$ (which is one among $j_0$–1, $j_0$ or $j_0$+1) of the pixel (with F(i+1,$j_x$)=1) is set to be the primary position of the next object pixel $j_0$ and the secondary position is proceeded by 1. When all the three similarity flags have the value 0 (i.e., the neighboring pixels are all in the dissimilar area), the process proceeds to step S6.45. In step S6.45, pixels having the similarity flag value of 1 (F(i,j)=1) are searched within the angle of ±45° to the right of the object pixel, and the nearest one of such pixels is determined (the pixel is hereinafter referred to as the subhead pixel). Then an appropriate path $P_{th}$(i+1) to $P_{th}$(k–1) is determined between the present object pixel G(i,j) and the subhead pixel G(k,$j_n$) (the area between the two pixels is the dissimilar area) according to a preset rule (e.g., path closest to the straight line connecting the two pixels, or path having the smallest selection criterion $V_t$). And the virtual line flag $F_t$(i) for every pixel on the path thus determined (the path passing through the dissimilar area) is set to 1 at step S6.46. After determining the path to the subhead pixel, the subhead pixel is set to the next object pixel at step S6.47.

After the next object pixel is determined at step S6.48 or S6.47, it is judged at step S6.49 whether the optional cutting line has reached the end of the secondary scanning direction (i>$i_{max}$). If the optional cutting line has not yet reached the end, the process returns to step S6.42 and the above steps are repeated. When i>$i_{max}$, i.e., when all the pixels of the optional cutting line are determined, the process returns to step S6.5 of the flowchart of FIG. 18.

It is judged at step S6.5 whether all the virtual line flags $F_t$(i) of the pixels constituting the optional cutting line determined at step S6.4 are 0. If all the virtual line flags $F_t$(i) are 0, i.e., the optional line passes solely through a similar area, the process proceeds to step S6.10, where the optional cutting line is determined as the actual cutting line and the path data (the data in the path memory $P_{th}$(i)) of the optional cutting line is put into the path memory for the actual cutting line.

If any pixel of the optional cutting line has the virtual line flag $F_t$(i)=1, the selection criterion $V_t$ (which is accumulated at step S6.42 of FIG. 19) is compared with the reference value $V_{tr}$ and judged which is smaller. If the selection criterion $V_t$ of the latest produced optional cutting line is smaller than the reference value $V_{tr}$, the selection criterion $V_t$ is substituted for the reference value $V_{tr}$ and the path data $P_{th}(i)$ of the optional cutting line is put into a tentative path memory. If the selection criterion $V_t$ of the latest produced optional cutting line is equal to or greater than the reference value $V_{tr}$, the reference value $V_{tr}$ and the tentative path memory are preserved (step S6.6).

Step S6.7 is the judgement for repeating the loop of steps S6.3 to S6.6 for all pixels (j=0 to $j_{max}$–N) on the first primary scanning line (i=0). After the condition of step S6.7 is satisfied and the tentative path of the cutting line is determined as the optional cutting line having the minimum selection criterion $V_t$ (or as the optional cutting line passing solely through a similar area), the tentative path is determined as the final cutting line at step S6.9. That is the end of step S6 of the main routine shown by FIG. 1.

In the above embodiment, virtual line flags F(i) are used for the convenience of calculation. It is possible instead to use the similarity flags F(i,j) attached to the pixels on the optional cutting line.

In the above embodiment, the cutting line is automatically produced and determined to alleviate the operator's burden. It is possible, on the other hand, to alleviate the burden of the machine (which can reduce the production cost) with a little manual operation of the operator. For example, in determining the cutting line, the image as shown in FIG. 6 is first shown on the graphic display 13. That is, the image data in the first memory 21 is sent to the graphic display 13 and the original picture is shown on the screen of the graphic display 13. In addition to that, the similarity judgement data in the second memory 22 is sent to the graphic display 13 and pixels in the similar area (denoted by open circles in FIG. 6) are distinctively (e.g., with a distinct color or with blink) shown on the screen of the graphic display 13. Looking at the screen, the operator draws the cutting lines using the input device 17. It is preferable of course to draw the cutting line so that the cutting line passes through similar areas as much as possible. Further it is possible to let the operator draw some optional cutting lines and the CPU 151 calculates the selection criterion $V_t$ of every optional cutting line so that the optimal one is selected as the final (actual) cutting line.

Producing a Unit Pattern

Figure 7:
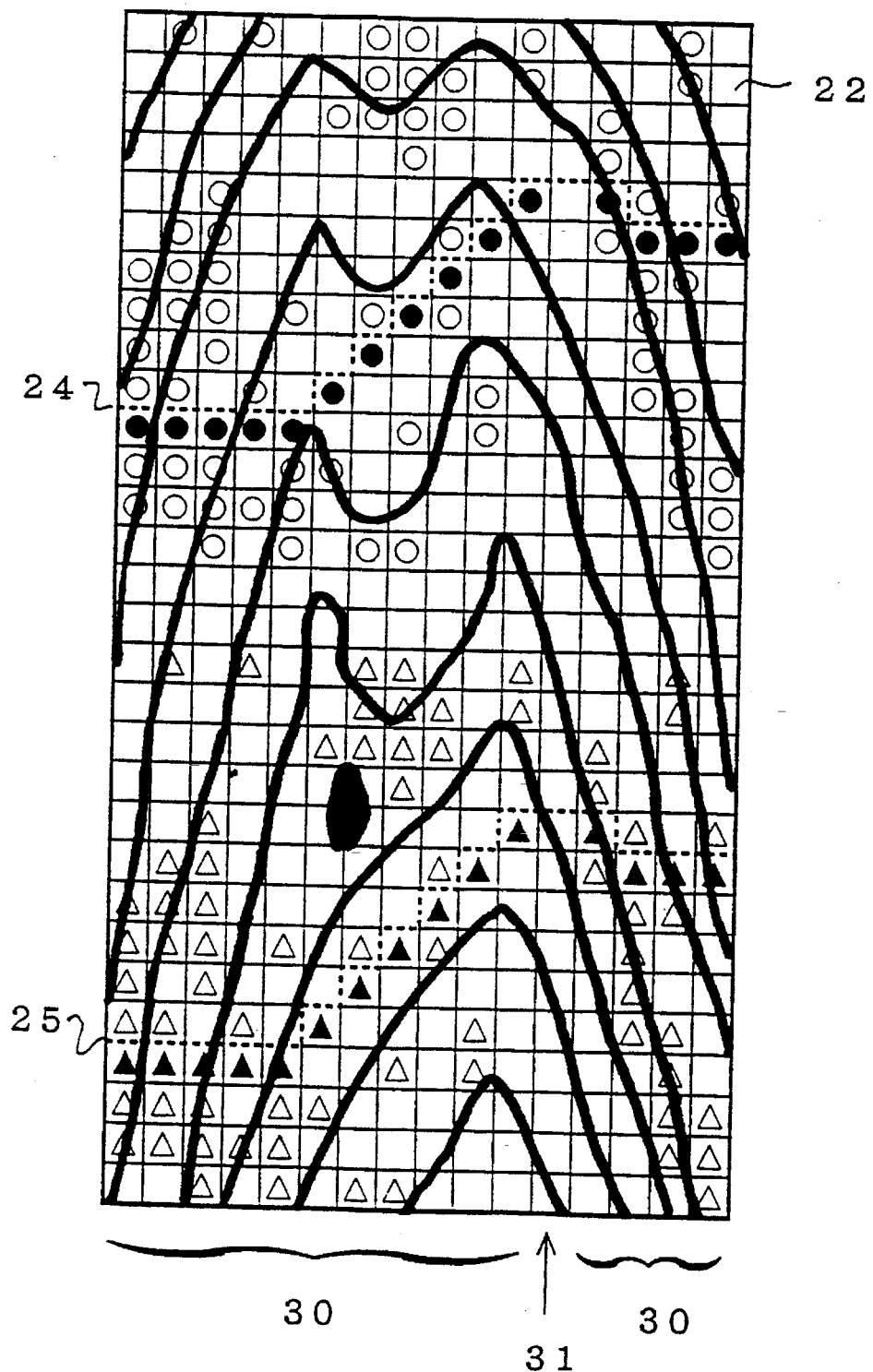
FIG. 7 is a schematic illustration showing the pixel structure with the cutting lines for producing a unit pattern.

When the cutting line 24 is determined as shown by the broken line in FIG. 7, another cutting line 25 parallel to the first cutting line 24 (i.e., having the same shape as the first cutting line 24) is drawn with the distance of the repetition length L (or N pixels) in the primary scanning direction, and the image data between the two cutting lines 24 and 25 stored in the first memory 21 is transferred to the third area of the RAM 153 (third memory 23), where the irregularly shaped unit pattern is rectified to a rectangular unit pattern in order to record onto the printing cylinder 121. The abstract of the unit pattern producing process is as follows.

In transferring the image data by the primary scanning line in the later described routine of FIG. 20, the CPU 151 judges whether the present primary scanning line is a continuous line 30 or a discontinuous line 31. As shown in FIG. 7, a continuous line 30 is such a primary scanning line whose ends (produced by the cutting lines 24 and 25) are in the similar area, and a discontinuous line 31 is such a primary scanning line whose ends are in the dissimilar area. When the present primary scanning line is a continuous line 30, a small transition areas of width (length in the primary scanning direction) α is taken to smooth the image at the joint of the opposing ends. If the reference value R is set at a rather small value (i.e., if the similarity is judged strictly), the transition width α can be zero, as shown in FIGS. 8 and 9.

When the present primary scanning line is a discontinuous line 31, a large transition areas 33 of width β is taken. Since, in this case, there is a difference greater than R in the image data at the joint of adjacent unit patterns, the large transition width 33 is necessary to smooth (or camouflage) such a steep difference. In the transition area 33, the data at one end of a primary scanning line (of a unit pattern) and the data of the other end are added with gradually changing weights. The image data thus smoothed is stored in the third memory 23. It is of course possible to change the transition length gradually according to the difference at the joint instead of the above example in which only two widths α and β are used.

Figure 8:
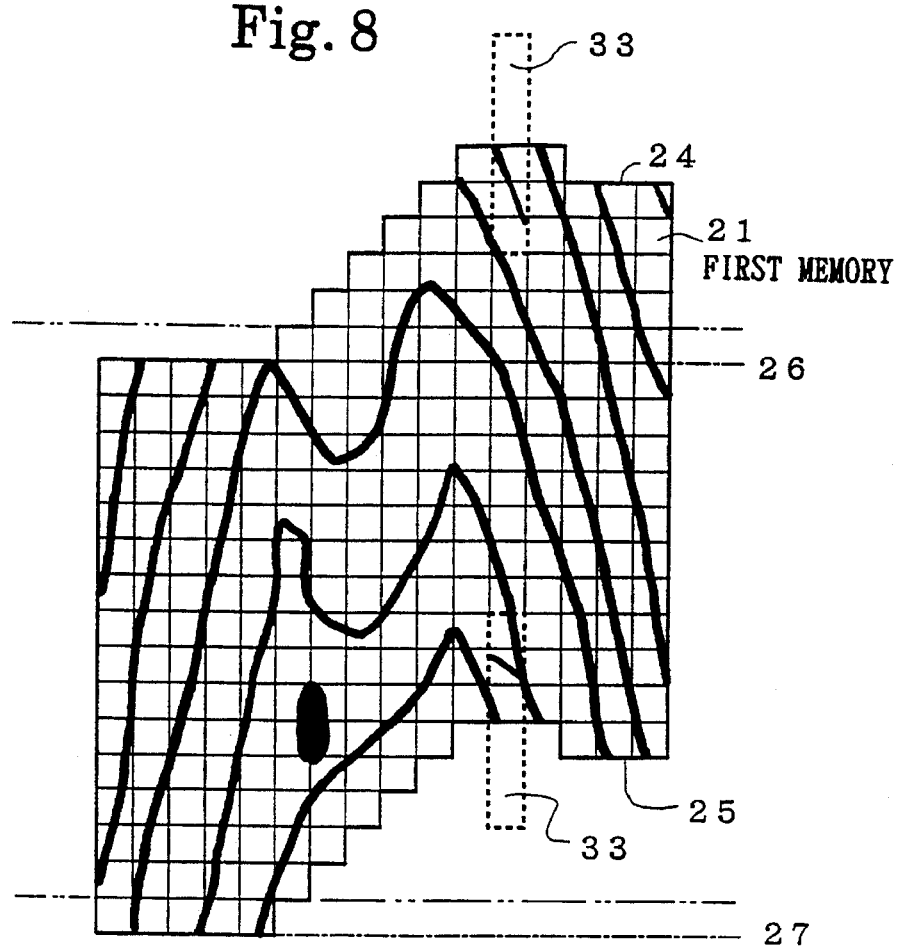
FIG. 8 shows a unit pattern.
Figure 9:
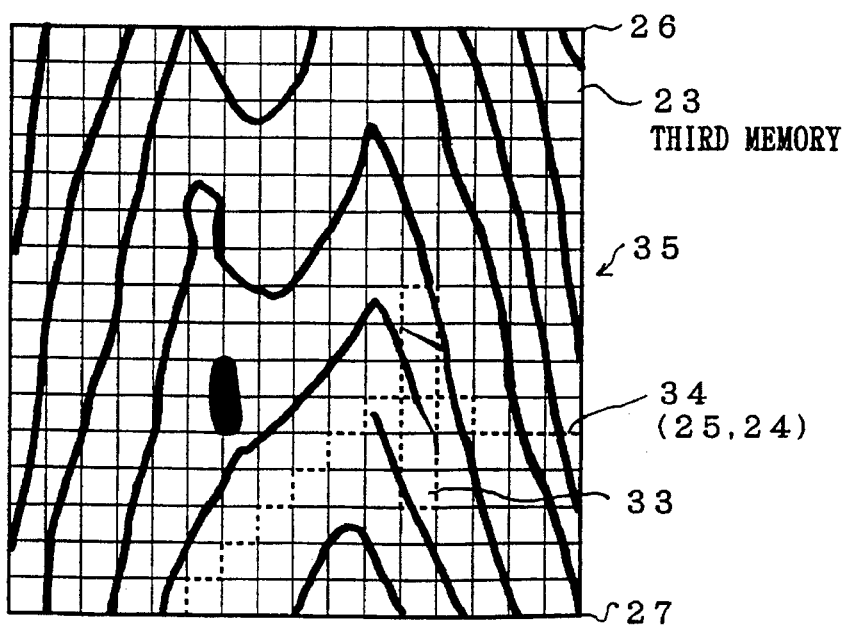
FIG. 9 shows a rectified unit pattern.

As shown in FIG. 8, the area between the two cutting lines 24 and 25 is generally not rectangular. Therefore, in transferring the image data to the third memory 23, the data on the second primary scanning line or after and lying outside of the two straight lines 26 and 27 (which originate from the ends of the first primary scanning lines) should be moved to the inside thereof, whereby a rectangular unit pattern 35 is formed in the third memory 23 as shown in FIG. 9. The positions of the two straight lines (which is hereinafter referred to as the joining lines) 26 and 27 do not necessarily coincide with the ends of the first primary scanning lines but they can be anywhere as long as they are separate by the repetition length L (or N pixels), as shown by the double chain line in FIG. 8.

Figure 20:
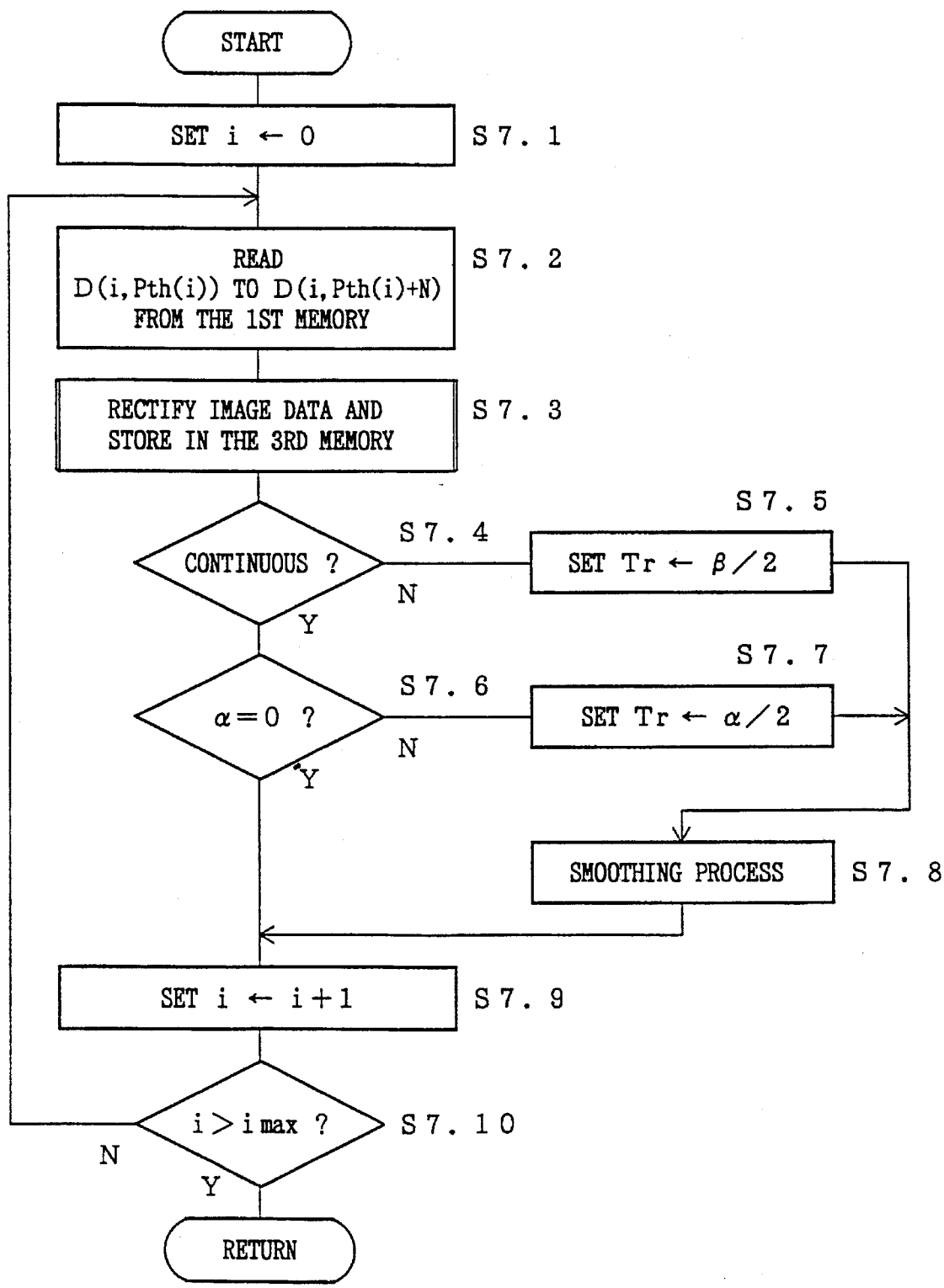
FIG. 20 is a flowchart of a subroutine for producing a unit pattern.

The unit pattern producing process is detailed referring to the flowchart of FIG. 20. Since the image data is processed by the primary scanning line, the variable i representing every primary scanning line is initialized to 0 (step S7.1) and incremented by 1 (step S7.9) until i> $i_{max}$ (step S7.10), while steps S7.2 to S7.9 are repeated. The process executed on every primary scanning line is as follows.

Figure 21:
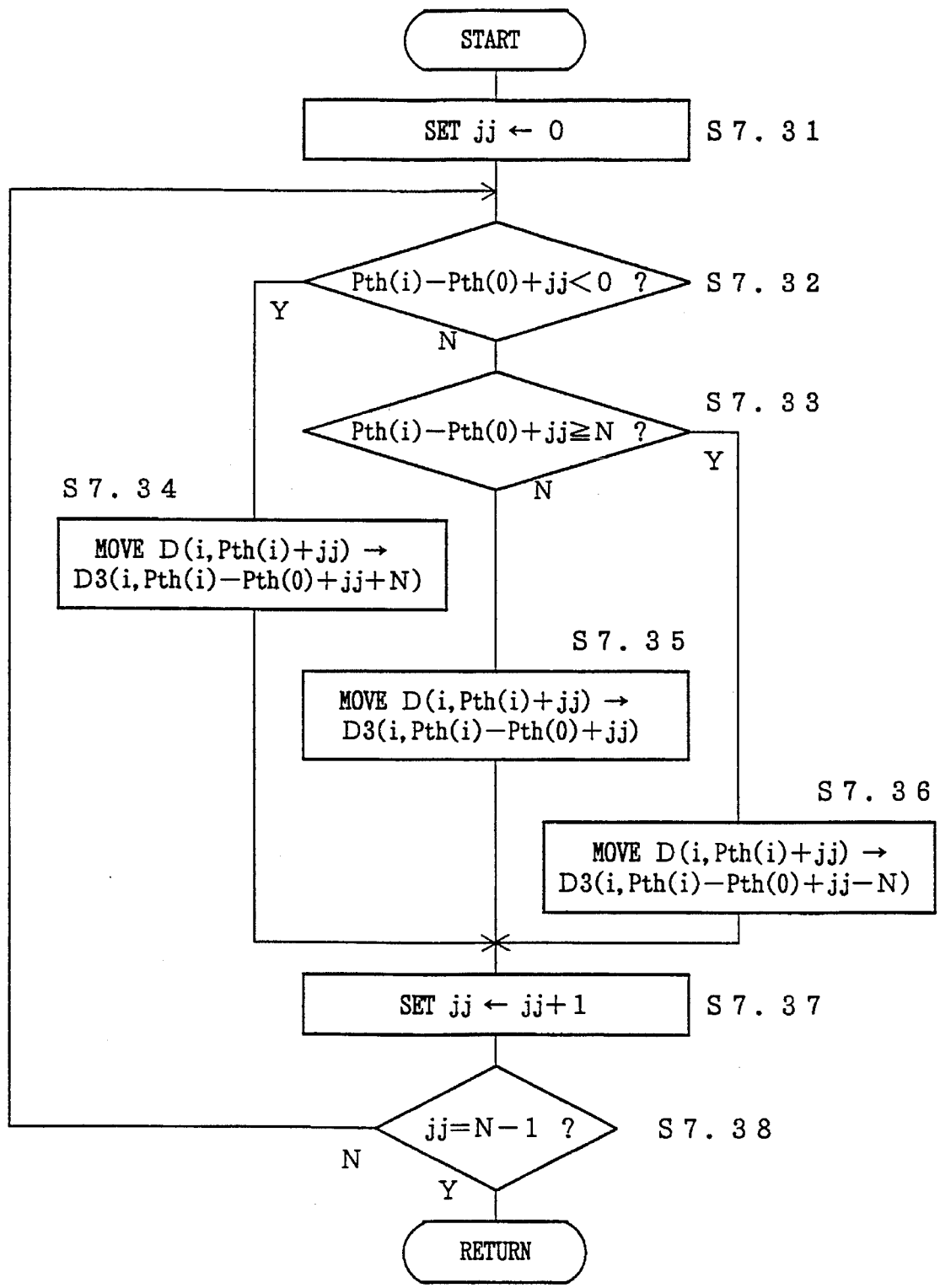
FIG. 21 is a flowchart of a subroutine for rectifying the unit pattern.

First, image data D(i,j) of the pixels at j=$P_{th}(i)$ to j=$P_{th}(i)$+N on the present object line (primary scanning line) i are read out from the first memory 21, where $P_{th}(i)$ is the path data of the actual cutting line determined at step S6.10 (FIG. 18). That is, data of N pixels (which corresponds to the repetition length L) are retrieved in the primary scanning direction from the cutting line. Then the retrieved data are stored in the third memory 23 to form a rectangular unit pattern (step S7.3). The rectifying process is detailed referring to the flowchart of FIG. 21.

In the rectifying process, a variable jj is used to count the pixels in a primary scanning line. First the variable jj is initialized to 0 (step S7.31) and incremented by 1 (step S7.37) until jj=N–1 (step S7.38), while the following process is executed on every object pixel. First, it is judged at step S7.32 whether $P_{th}(i)$–$P_{th}(0)$+jj is less than 0. Since $P_{th}(0)$ is the position of the cutting line on the first primary scanning line (i=0), step S7.32 is to judge whether the object pixel is above the joining line 26. If the result is NO at step S7.32, then it is judged whether the object pixel is outside of the other joining line 27 (step S7.33). If both are judged NO (i.e., the present object pixel is between the two joining lines 26 and 27), the image data D(i, $P_{th}(i)$+jj) of the object pixel in the first memory 21 is transferred to the site (i,$P_{th}(i)$–$P_{th}(0)$+jj) of the third memory 23 (step S7.35). If the judgement result is YES at step S7.32, the image data D(i,$P_{th}(i)$+jj) is stored at the site (i,$P_{th}(i)$–$P_{th}(0)$+jj+N) (which is N pixels ahead in the primary scanning direction) in the third memory 23 (step S7.34). If the judgement result is YES at step S7.33, the image data D(i,$P_{th}(i)$+jj) is stored at the site $(i, P_{th}(i) - P_{th}(0) + jj - N)$ (which is N pixels behind) in the third memory 23 (step S7.36). Thus the image data forming the irregularly shaped unit pattern in the first memory 21 are transferred to the third memory 23 forming a rectangular shaped (rectified) unit pattern.

Returning to FIG. 20, after all the image data of a unit pattern are transferred to the third memory 23, it is judged whether the end pixels (i.e., pixels on the cutting lines) of the present object line are in a similar area or in a dissimilar area (step S7.4). The judgement can be achieved by referring to the value of the similarity flag $F(i,j)$ of the end pixels. If the end pixels are judged to be in a dissimilar area, the value of half of the transition width $\beta$ is put into a variable $T_r$ which will be used in the following smoothing process (step S7.8). If the end pixels are judged to be in a similar area, it is further judged whether the smaller transition width $\alpha$ equals zero. When $\alpha \neq 0$, the value of $\alpha/2$ is put into the variable $T_r$ and the process proceeds to step S7.8. When $\alpha = 0$, the process jumps to step S7.9 since no smoothing process is necessary.

Figure 22:
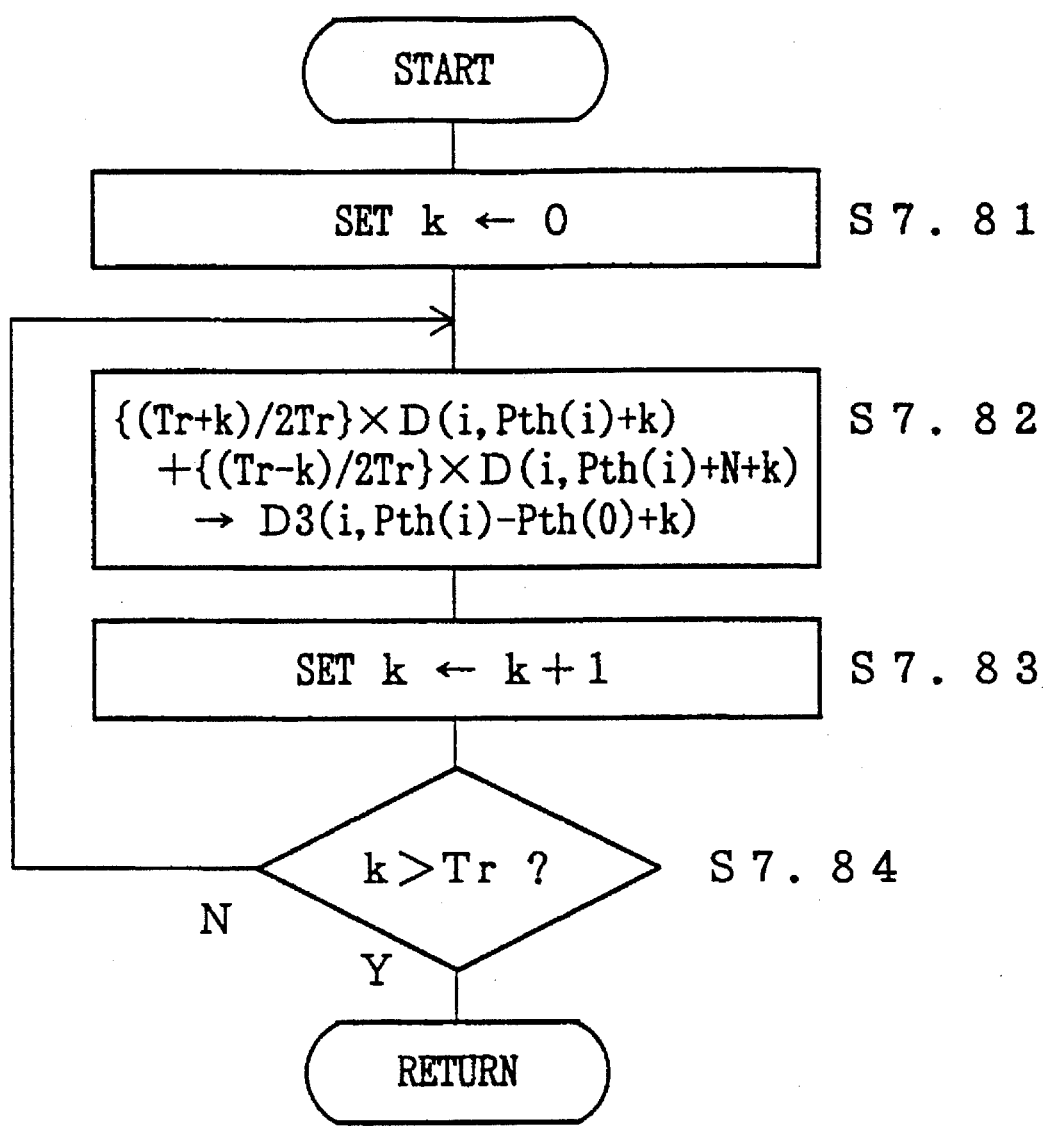
FIG. 22 is a flowchart of a subroutine for smoothing the data about the joint.

The smoothing process is detailed referring to the flowchart of FIG. 22. In the present routine, a counter k for counting pixels in a primary scanning line starting from the cutting line is first initialized to 0 (step S7.81) and incremented by 1 (step S7.83) until it reaches the half transition width $T_r$ ($\alpha/2$ or $\beta/2$), while the following process is executed.

The basic process executed on every pixel in the transition area is: a sum of two pieces of image data $D(i, P_{th}(i) + k)$ and $D(i, P_{th}(i) + N + k)$ with respectively given weight $(T_r + k)/2T_r$ and $(T_r - k)/2T_r$ is stored at the site $(i, P_{th}(i) - P_{th}(0) + k)$ of the third memory 23 (i.e., overwritten on the already existing image data $$d3(i, P_{th}(i) - P_{th}(0) + k)) \cdot d3(i, P_{th}(i) - P_{th}(0) + k) =$$

$$\{(T_r + k)/2T_r\} \cdot D(i, P_{th}(i) + k) +$$

$$\{(T_r - k)/2T_r\} \cdot D(i, P_{th}(i) + N + k)$$

If however, $P_{th}(i) - P_{th}(0) + k < 0$, the sum is stored at the site $(i, P_{th}(i) - P_{th}(0) + k + N)$ of the third memory 23.

$$d3(i, P_{th}(i) - P_{th}(0) + k + N) =$$

$$\{(T_r + k)/2T_r\} \cdot D(i, P_{th}(i) + k) +$$

$$\{(T_r - k)/2T_r\} \cdot D(i, P_{th}(i) + N + k)$$

The above calculations are applicable to the pixels behind the cutting line. For the pixels lying ahead of the cutting line, the calculations are as follows.

$$d3(i, P_{th}(i) - P_{th}(0) + N - T_r + k) =$$

$$\{k/2T_r\} \cdot D(i, P_{th}(i) - T_r + k) +$$

$$\{(T_r - k)/2T_r\} \cdot D(i, P_{th}(i) + N - T_r + k)$$

If, however, $P_{th}(i) - P_{th}(0) + k \geq N$, the sum is stored at the site $(i, P_{th}(i) - P_{th}(0) - T_r + k)$ of the third memory 23.

$$d3(i, P_{th}(i) - P_{th}(0) - T_r + k) =$$

$$\{k/2T_r\} \cdot D(i, P_{th}(i) - T_r + k) +$$

$$\{(T_r - k)/2T_r\} \cdot D(i, P_{th}(i) + N - T_r + k)$$

Figure 4A:
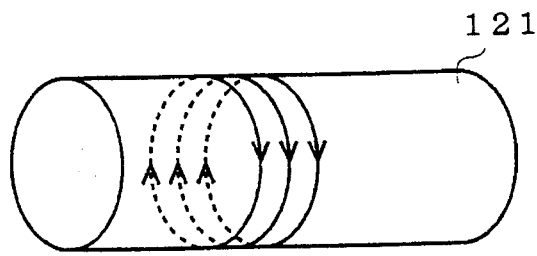
FIG. 4A is an illustration of a ring recording method and FIG. 4B is an illustration of a helical recording method.

When a rectangular unit pattern 35 is thus formed in the third memory 23, the data is sent to the output section 12 and recorded on the printing cylinder 121 (step S8). In this embodiment, the printing cylinder 121 is continuously rotated and the recording head 124 is moved intermittently, while the image data is engraved on the printing cylinder 121 in the ring recording manner as shown in FIG. 4A. When the engraving is finished, the printing cylinder 121 bears the unit pattern 35 as shown in FIG. 9.

In the unit pattern 35 thus produced in the following process, obscurity is minimized about the boundary 34 (i.e., the cutting line 24 and 25) since the transition width is set small (or set zero) at the similar areas 30 (in which the difference in the pattern is originally small) and the length of the cutting line passing through the dissimilar areas 31 is minimized. On the other hand, a large transition width is secured in the dissimilar areas 31, whereby steep change in the pattern is avoided and smooth and natural transition is obtained at the boundary 34.

Figure 10:
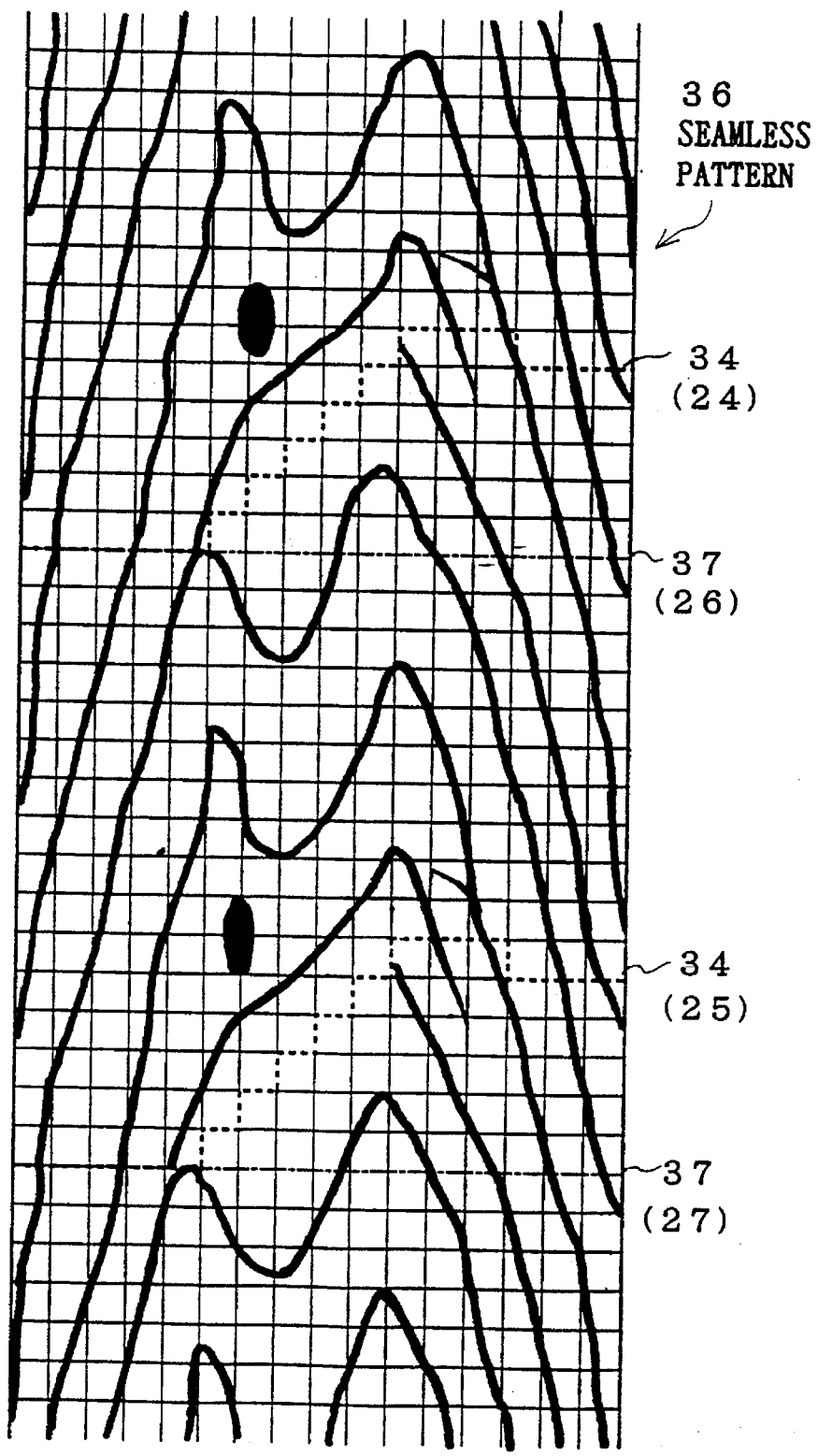
FIG. 10 shows a seamless pattern printed with the rectified unit pattern.

The seamless pattern 36 printed by the printing cylinder 121 bearing the unit pattern 35 is shown in FIG. 10. In FIG. 10, the line 34 is the boundary due to the cutting lines 24 and 25, and the line 37 is the boundary due to the joining lines 26 and 27. No steep change occurs at the joining lines 37 and natural seamless pattern is obtained.

Figure 23:
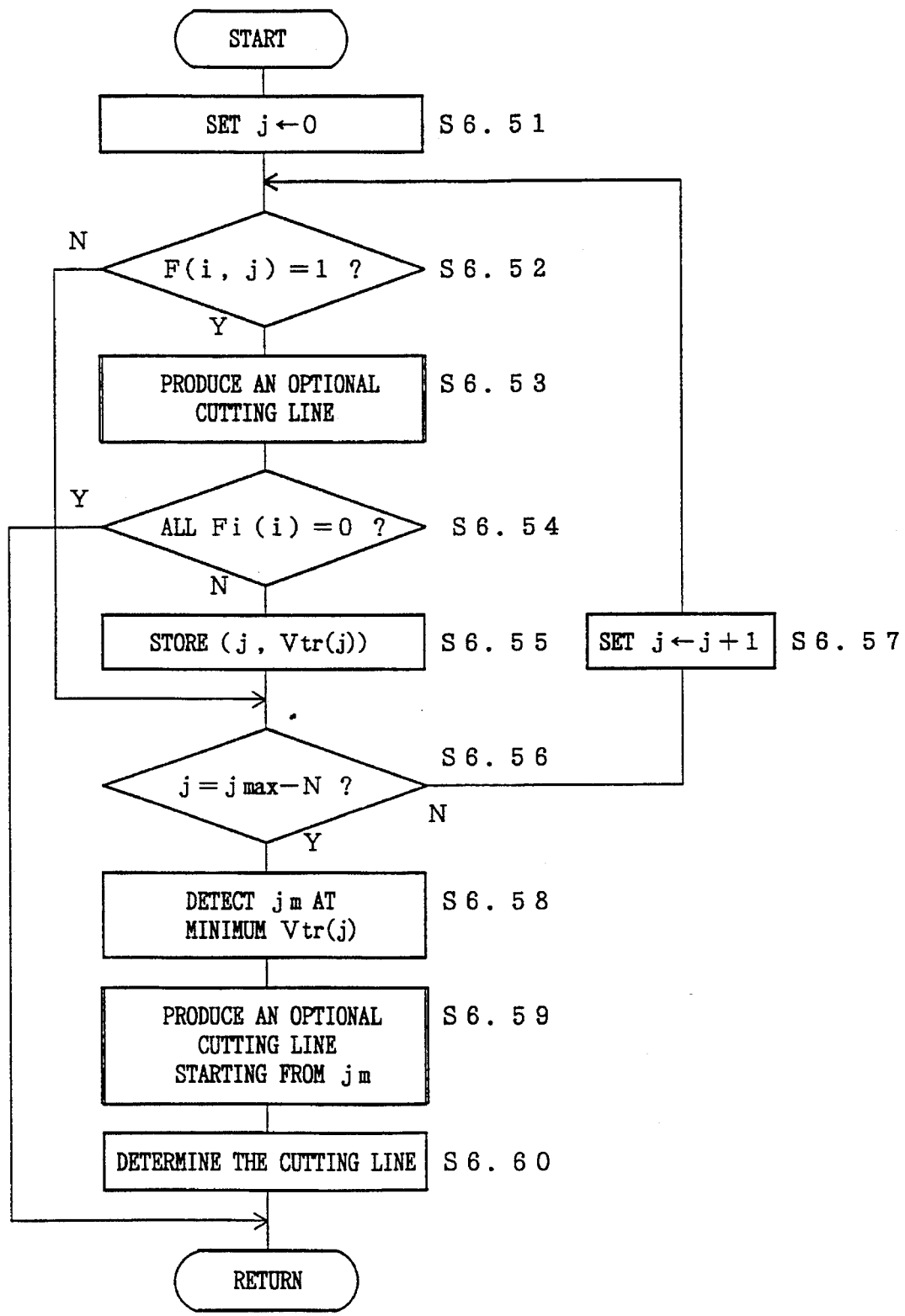
FIG. 23 is a flowchart of another subroutine for producing an option of the cutting line.

Instead of the routine of FIG. 18 for the cutting line producing process of step S6 of FIG. 1 in the above embodiment, the routine as shown in FIG. 23 can be used. The routine of FIG. 23 is basically the same as the routine of FIG. 18 and the process steps of the two routines correspond to each other as follows: S6.2=S6.51, S6.3=S6.52, S6.4=S6.53, S6.5=S6.54, S6.7=S6.56, S6.8=S6.57, S6.9=S6.60. However, the routine of FIG. 23 differs from that of FIG. 18 in the treatment of the path data $P_{th}(i)$. That is, at step S6.6 of the routine of FIG. 18, the path data $P_{th}(i)$ of the whole path is updated as well as the reference value $V_{tr}$ when the present selection criterion $V_t$ is smaller than the previous minimum value $V_t$. On the other hand, in the routine of FIG. 23, no memory area is provided for storing the path data of the optional cutting line, but the selection criterions $V_{tr}(j)$ of all the optional cutting lines starting from the pixels on the first primary scanning line ($j=0$ to $j_{max}-N$) are stored in the memory (step S6.55). Then the position of the pixel $j_m$ having the minimum selection criterion $V_{tr}(j)$ is detected (step S6.58), and the cutting line starting from the pixel $j_m$ is reproduced (step S6.59), which is determined as the actual cutting line (step S6.60). The process of step S6.59 can use the routine of step S6.53, and both steps can use the routine of FIG. 19.

In the cutting line producing step S6.4 (steps S6.41 to S6.49) of the above embodiment, one optional cutting line is produced starting from one pixel on the first primary scanning line. It is possible instead to produce plural optional cutting lines from one pixel and select one of them having the smallest value of the selection criterion $V_t$.

The accumulated value of the absolute difference in the image data between the corresponding pixels is adopted as the selection criterion $V_t$ in the above embodiment. It is possible instead to adopt the length of the parts of the cutting line that pass through the dissimilar areas.

In the case of multi-color printing, the cutting line must be identical throughout the component colors (e.g., cyan, magenta, yellow and black). In this case, it is possible to execute the above process to produce the cutting line on one color. But it is preferable to consider all the component colors as follows. First, brightness data is produced for every pixel constituting the original picture from the data of the component colors of the same pixel. Then the brightness data is used in the similarity judgement of step S5 or in the cutting line producing process of step S6.

The controller 15 executing steps S5, S6, S7.3 and S7.8 correspond respectively to the judging means, the cutting line producing means and the unit pattern producing means.

Figure 4B:
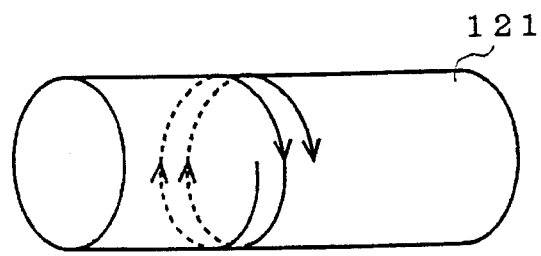

The above embodiment uses the ring recording method as shown in FIG. 4A. Since, as explained before, the helical recording method as shown in FIG. 4B is more efficient, the process of producing a printing cylinder for a seamless pattern using the helical recording method is then described. In the helical recording method, a problem is the shift of the pixels in the secondary scanning direction along the joining lines 26 and 27. If, for example, the unit pattern shown in FIG. 9 (which is produced for the ring recording method) is used in the helical recording method, the ends of a primary scanning line shift by one pixel in the secondary scanning direction, whereby a consecutive shift in the image arises along the joining line (as the joining line 37 of FIG. 10) of adjacent unit patterns.

Figure 11:
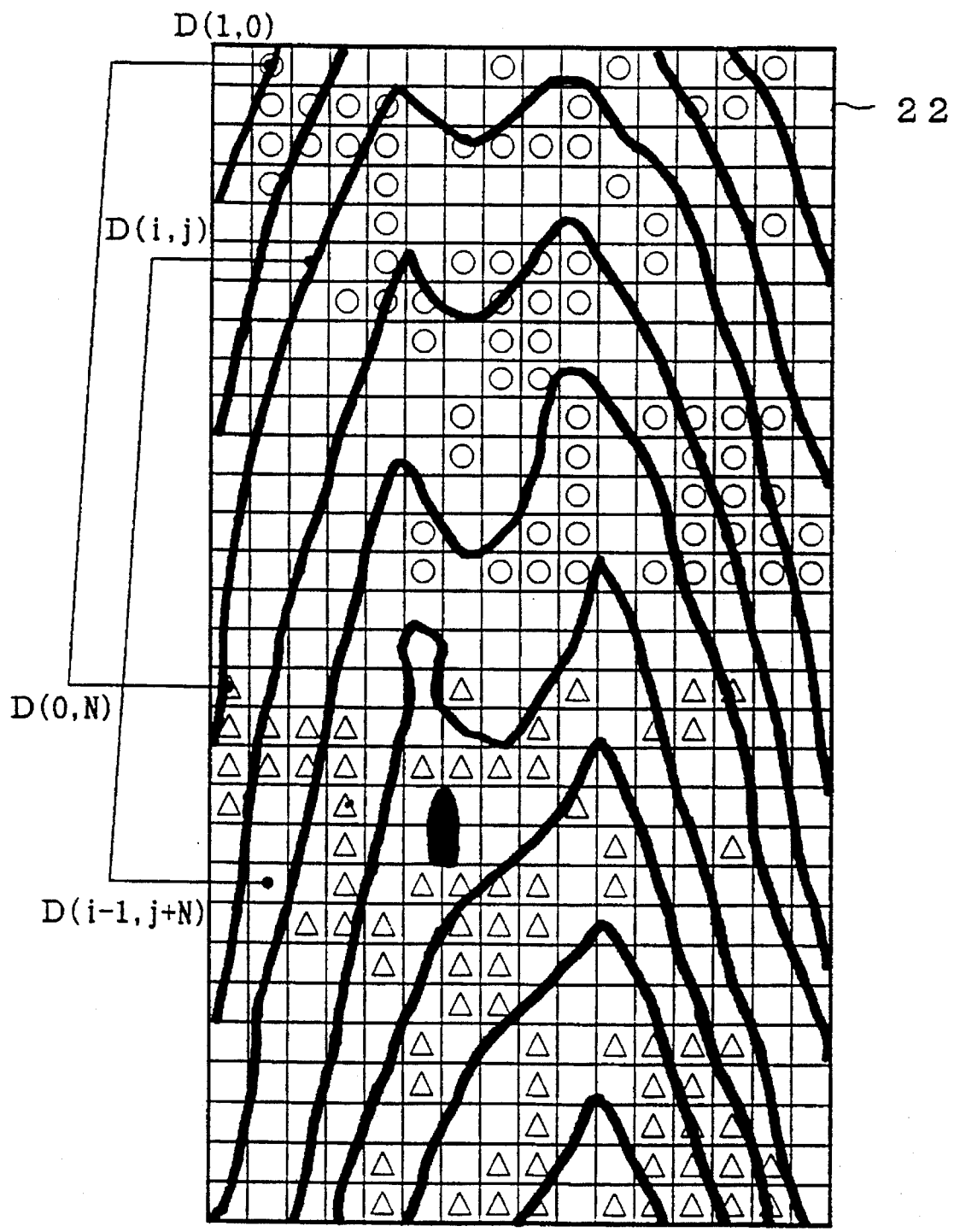
FIG. 11 is a schematic illustration showing the original picture overlapped with the pixel structure and similarity data taken for the helical recording method.

In order to avoid the shift, in the present embodiment, the similarity judgement at step S5 is executed between two pixels of neighboring primary scanning lines (and N pixels distant from each other in the primary scanning direction) as shown in FIG. 11, instead of between pixels of the same primary scanning line in the above embodiment. In the concrete, the element G(1,0) is compared with the element G(0,N), and the element G(i,j) is compared with the element G(i−1,j+N). Thus, in the second memory 22, the corresponding similarity data of an end (denoted by an open circle) of a primary scanning line and the other end (denoted by an open triangle) of the primary scanning line are shifted by one pixel in the secondary scanning direction.

Figure 12:
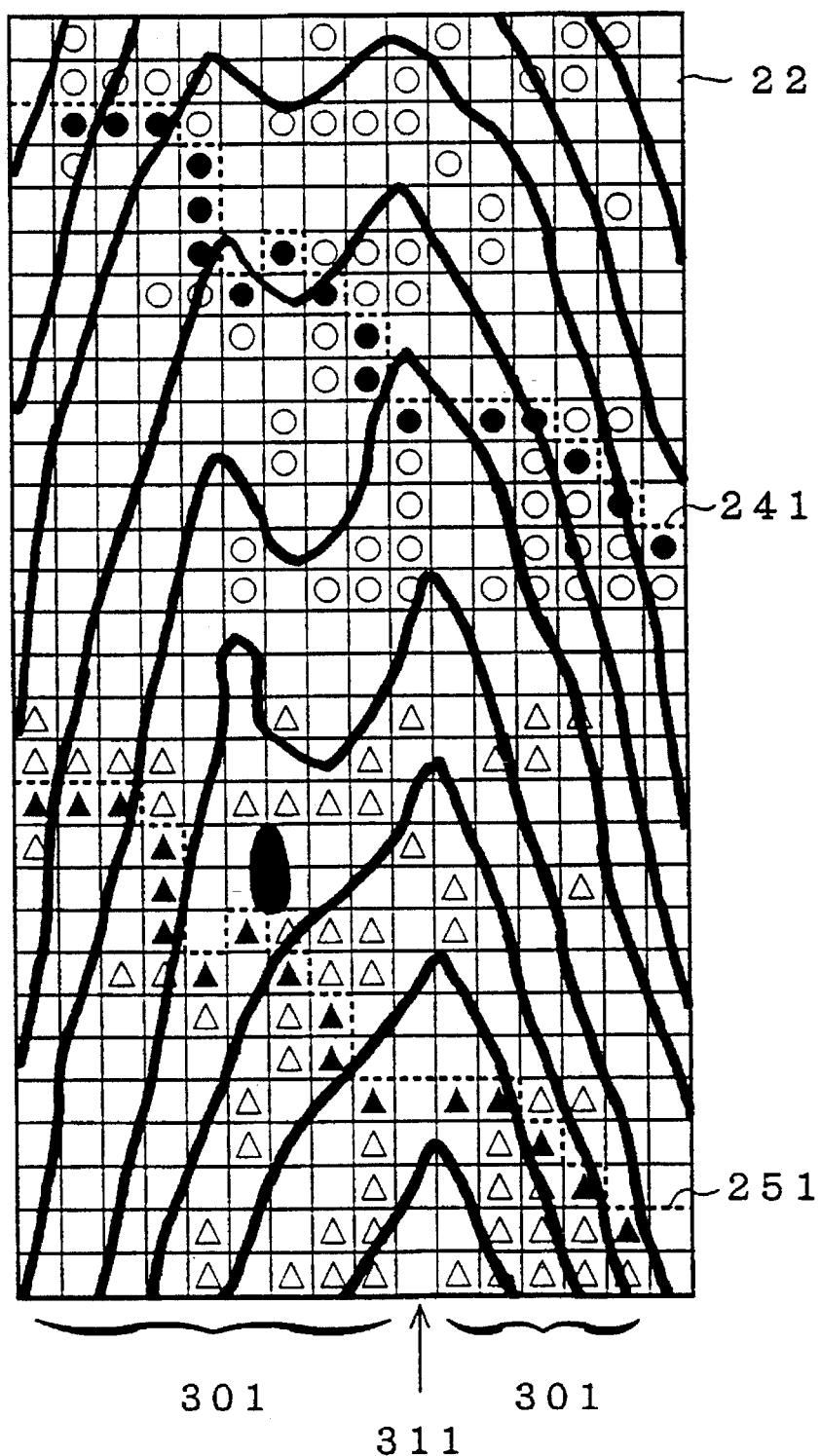
FIG. 12 is a schematic illustration showing the pixel structure with the cutting lines.

The cutting line producing process at step S6 is almost the same as in the above embodiment except that the corresponding image data are D(1,0), D(0,N), D(i,j) and D(i−1, j+N). In this case, as shown in FIG. 12, the two cutting lines 241 and 251 shift from each other by one pixel in the secondary scanning direction. The similar areas 301 and the dissimilar areas 311 also shift. Because no corresponding pixel exists at one end of a cutting line (left end pixel on the beginning cutting line 241, and right end pixel on the ending cutting line 251), the cutting lines 241 and 251 stop there. They can be simply extended in the secondary scanning direction.

Figure 13:
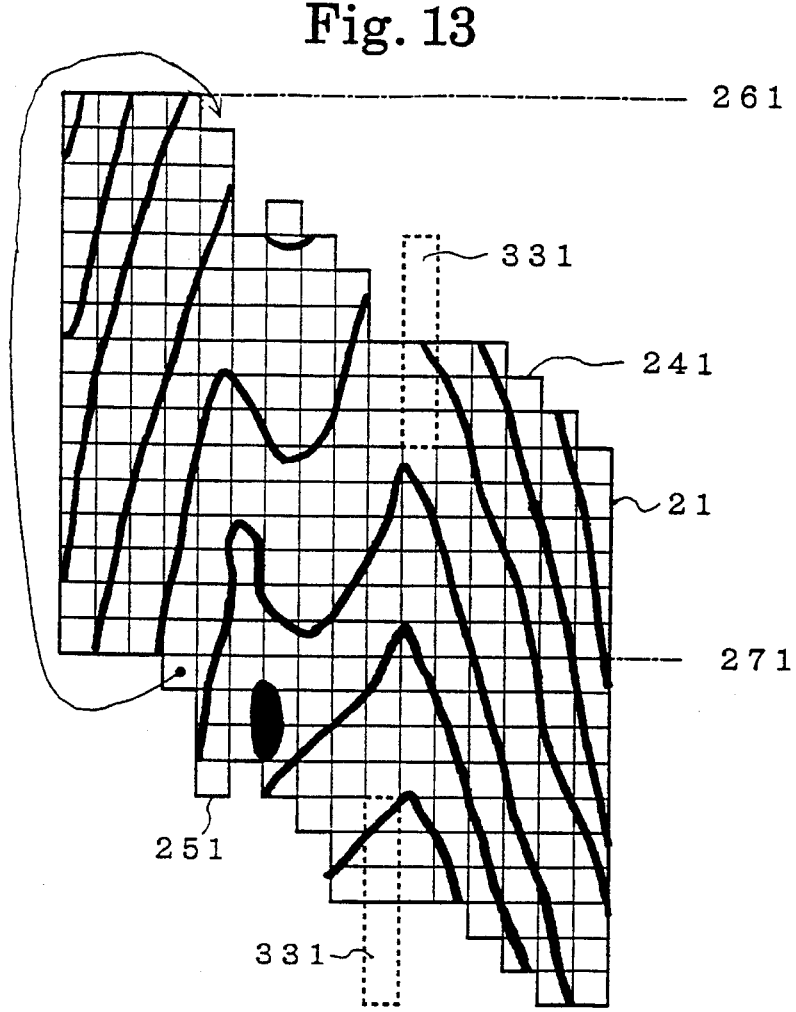
FIG. 13 shows a unit pattern for the helical recording method.
Figure 14:
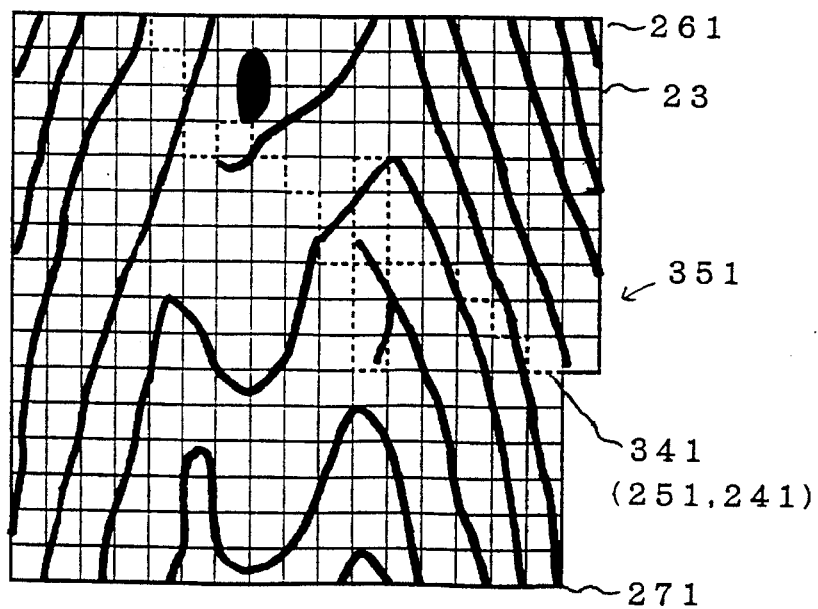
FIG. 14 shows a rectified unit pattern for the helical recording method.

The data transfer at step S7 from the first memory 21 to the third memory 23 is done by the primary scanning line, as in the above embodiment. When, in this case, the pixels lying outside of the two straight joint lines 261 and 271 (which respectively originate from the beginning and end of the first primary scanning line) are moved within the lines 261 and 271, appropriate treatment is needed: i.e., the pixels behind the beginning joint line 261 are moved to the previous primary scanning line, and the pixels ahead the end joint line 271 are moved to the subsequent primary scanning line, as shown in FIG. 13. Thus the smoothing process at step S7.8 is executed on every pair of neighboring primary scanning lines. Since the two cutting lines 241 and 251 shift from each other by one pixel in the secondary scanning direction, such manner of pixel movement results in the unit pattern 351 as shown in FIG. 14 in the third memory 23.

Figure 15:
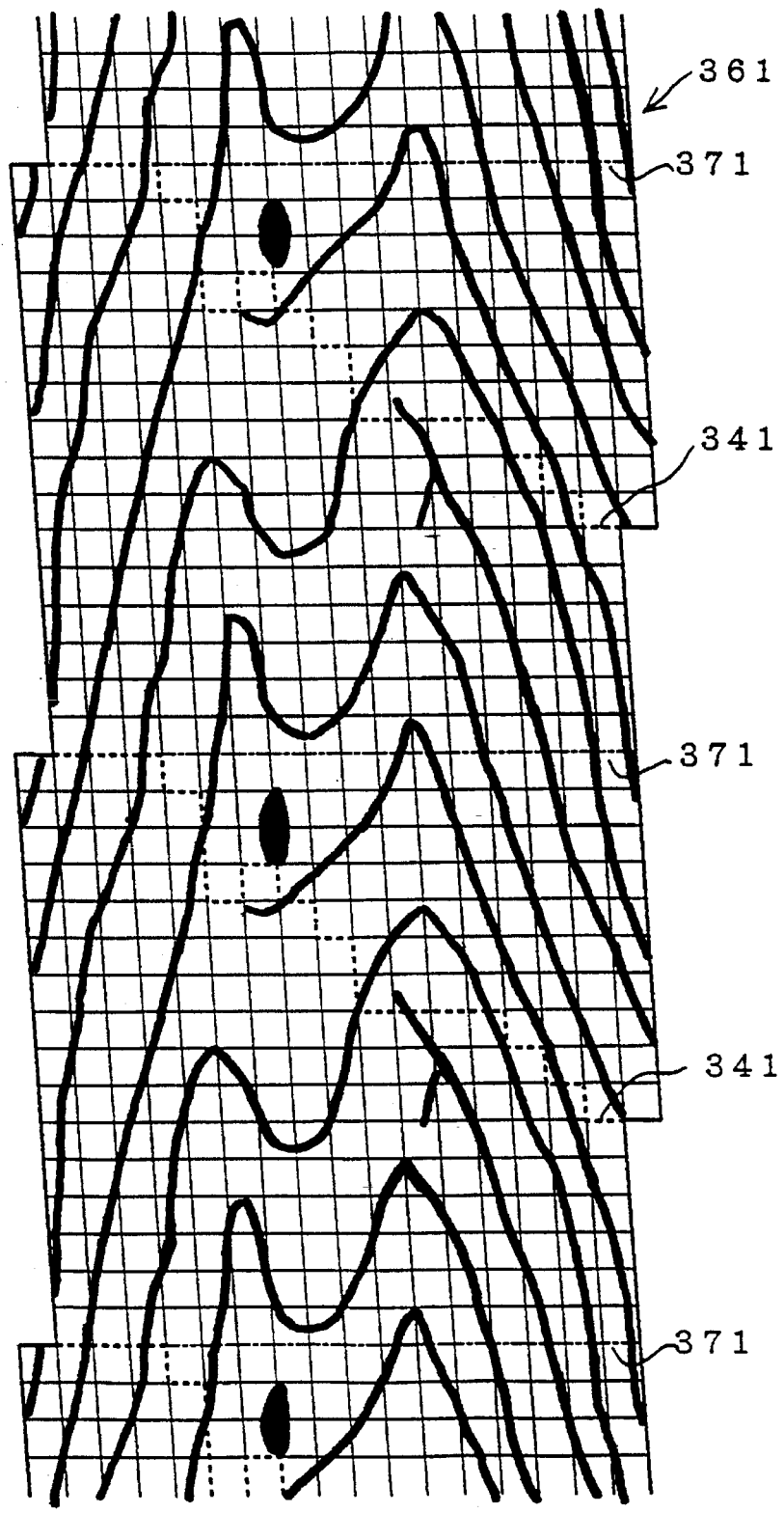
FIG. 15 shows a seamless pattern printed with the helical recording method.

In the unit pattern 351 thus formed in the third memory 23, the corresponding pixels shift by one pixel in the secondary scanning direction between the beginning and end of a primary scanning direction. The unit pattern 351 is recorded on the printing cylinder 121 using the helical recording method as shown in FIG. 4B. When a printing is performed using the printing cylinder 121 thus recorded, a seamless pattern 361 as shown in FIG. 15 having no lateral shift (or discrepancy) along the joint lines 371 (or 261 and 271) between the unit patterns 351 is obtained. Of course, as in the previous embodiment, the steep change in the image at the cutting lines 241 and 251 in the primary scanning direction is minimized.

In the above embodiment, the image data are shifted by one pixel in the secondary scanning direction. When the density of the image data stored in the first memory 21 is different from the recording density (e.g., in the case where the high-density image data for an offset printing is used for the gravure printing whose resolution or density is rather low), the amount (the number of pixels) of shift needed in the similarity judgement process and the data transferring process depends on the recording pitch in the secondary scanning direction of the output section.

Though the two embodiments explained above are for printing a seamless pattern, it is of course possible to produce a printing cylinder for printing an endless patten of the narrower sense. The present invention is of course applicable to a rotary screen printing as well as the gravure printing as described above.

What is claimed is:

1. A method of producing a unit pattern on a printing cylinder for printing an endless pattern on a printing medium by repeatedly printing said unit pattern, said unit pattern having a repetition length in a primary scanning direction, said method comprising the steps of:

storing pixel signals expressing pixels of an original picture in memory means, said pixels of said original picture being arranged in said primary scanning direction and a secondary scanning direction orthogonal thereto;

distinguishing said pixel signals stored in said memory means into first pixel signals and second pixel signals by comparing said pixel signals with respective their corresponding pixel signals distant therefrom by said repetition length in said primary scanning direction, said first pixel signals being approximate to said corresponding pixel signals, and said second pixel signals being much different from the same;

producing a cutting line extending across said original picture in said secondary scanning direction, said cutting line passing through said pixels of said original picture expressed by said first pixel signals as much as possible;

extracting pattern pixel signals from said pixel signals stored in said memory means, said pattern pixel signals existing between said cutting line and an imaginary line distant therefrom by said repetition length in said primary scanning direction;

smoothing said pattern pixel signals close to said cutting line and said imaginary line in said primary scanning direction, thereby producing unit pattern signals expressing said unit pattern; and recording said unit pattern on said printing cylinder on the basis of said unit pattern signals.

2. The method according to claim 1, further comprising the step of converting said unit pattern signals into a rectangular unit pattern signals expressing a rectangular unit pattern, and wherein said unit pattern is recorded on said printing cylinder on the basis of said rectangular unit pattern signals.

3. The method according to claim 2, wherein said pixel signal is distinguished into said first pixel signal when an absolute difference between said pixel signal and said corresponding pixel signal is not larger than a predetermined reference value, and wherein said pixel signal is distinguished into said second pixel signal when said absolute difference therebetween is larger than said predetermined reference value.

4. The method according to claim 3, wherein each of said first pixel signals of said pattern signals is smoothed with a small transition width, and wherein each of said second pixel signals of the same is smoothed with a large transition width.

5. The method according to claim 4, wherein said small transition width is zero.

6. The method according to claim 4, wherein the step of producing said cutting line comprises the steps of:

producing a plurality of optional cutting lines;

obtaining accumulated values for said respective optional cutting lines, each said accumulated value being accumulated said absolute differences between said pixel signals constituting said cutting line and said corresponding pixel signals; and selecting an optional cutting line whose said accumulated value is minimum among said optional cutting lines.

7. The method according to claim 4, wherein said pixel signals are distinguished into said first pixel signals and said second pixel signals by comparing said pixel signals with said corresponding pixel signals, said corresponding pixel signals being further shifted from said respective pixel signals by a pixel in said secondary scanning direction.

8. The method according to claim 7, wherein said pattern pixel signals exist between said cutting line and said imaginary line, said imaginary line being further shifted from said cutting line by a pixel in said secondary scanning direction.

9. An apparatus for recording a unit pattern on a printing cylinder for printing an endless pattern on a printing medium by repeatedly printing said unit pattern, said unit pattern having a repetition length in a primary scanning direction, said apparatus comprising:

first memory means for storing pixel signals expressing pixels of an original picture, said pixels of said original picture being arranged in said primary scanning direction and a secondary scanning direction orthogonal thereto;

judging means for generating first judgment signals and second judgment signals by comparing said pixel signals with respective their corresponding pixel signals distant therefrom by said repetition length in said primary scanning direction, said first judgment signals expressing that said pixel signals approximate to said corresponding pixel signals, and said second judgment signals expressing that said pixel signals are much different from the same;

second memory means for storing said first judgment signals and said second judges signals;

cutting line producing means for producing a cutting line extending across said original picture in said secondary scanning direction, said cutting line passing through said pixels of said original picture associated with said first judgment signals as much as possible;

unit pattern extracting means for extracting pattern pixel signals from said pixel signals stored in said first memory means, said pattern pixel signals existing between said cutting line and an imaginary line distant therefrom by said repetition length in said primary scanning direction;

third memory means for storing said pattern pixel signals extracted by said unit pattern extracting means;

smoothing means for smoothing said pattern pixel signals close to said cutting line and said imaginary line in said primary scanning direction, thereby producing unit pattern signals expressing said unit pattern; and recording means for recording said unit pattern on said printing cylinder on the basis of said unit pattern signals.

10. The apparatus according to claim 9, wherein said recording means engraves said printing cylinder with said unit pattern on the basis of said unit pattern signals.

11. The apparatus according to claim 10, further comprising converting means for converting said unit pattern signals into a rectangular unit pattern signals expressing a rectangular unit pattern, and wherein said unit pattern is engraved on said printing cylinder on the basis of said rectangular unit pattern signals.

12. The apparatus according to claim 11, wherein said judging means generates said first judgment signal when an absolute difference between said pixel signal and said corresponding pixel signal is not larger than a predetermined reference value, and generates said second judgment signal when said absolute difference therebetween is larger than said predetermined reference value.

13. The apparatus according to claim 12, wherein each of said pixel signals associated with said first judgment signals is smoothed with a small transition width, and wherein each of said pixel signals associated with said second judgment signals is smoothed with a large transition width.

14. The apparatus according to claim 13, wherein said small transition width is zero.

15. The apparatus according to claim 13, said cutting line producing means comprising:

means for producing a plurality of optional cutting lines;

means for obtaining accumulated values for said respective optional cutting lines, each said accumulated value being accumulated said absolute differences between said pixel signals constituting said cutting line and said corresponding pixel signals; and means for selecting an optional cutting line whose said accumulated value is minimum among said optional cutting lines.

16. The apparatus according to claim 13, wherein said judging means generates said first judgment signals and said second judgment signals by comparing said pixel signals with said corresponding pixel signals, said corresponding pixel signals being further shifted from said respective pixel signals by a pixel in said secondary scanning direction.

17. The apparatus according to claim 16, wherein said pattern pixel signals exist between said cutting line and said imaginary line, said imaginary line being further shifted from said cutting line by a pixel in said secondary scanning direction.

* * * * *